US005570584A

United States Patent [19]
Phillips et al.

[11] Patent Number: 5,570,584
[45] Date of Patent: Nov. 5, 1996

[54] GENERATOR-ABSORBER HEAT EXCHANGE TRANSFER APPARATUS AND METHOD USING AN INTERMEDIATE LIQUOR

[75] Inventors: Benjamin A. Phillips, Benton Harbor; Thomas S. Zawacki, St. Joseph, both of Mich.

[73] Assignee: Phillips Engineering Co., St. Joseph, Mich.

[21] Appl. No.: 347,255

[22] Filed: Nov. 23, 1994

Related U.S. Application Data

[63] Continuation-in-part of Ser. No. 76,759, Jun. 15, 1993, Pat. No. 5,367,884, which is a continuation-in-part of Ser. No. 793,644, Nov. 18, 1991, Pat. No. 5,271,235.

[51] Int. Cl.$^6$ .................................................. F05B 15/00
[52] U.S. Cl. .............................. 62/101; 62/476; 62/483; 62/497
[58] Field of Search ............................. 62/101, 105, 112, 62/114, 141, 148, 238.3, 324.2, 476, 483, 485, 487, 495, 497

[56] References Cited

U.S. PATENT DOCUMENTS

| | | |
|---|---|---|
| 1,180,687 | 4/1916 | Altenkirch et al. . |
| 1,854,223 | 4/1932 | Randel . |
| 2,979,923 | 4/1961 | Bury . |
| 3,046,756 | 7/1962 | Whitlow et al. . |
| 3,055,194 | 9/1962 | Fink . |
| 3,236,064 | 2/1966 | Whitlow . |
| 3,254,507 | 6/1966 | Whitlow . |
| 3,323,323 | 6/1967 | Phillips . |
| 3,353,369 | 11/1967 | Whitlow . |
| 3,357,203 | 12/1967 | Briggs . |

(List continued on next page.)

OTHER PUBLICATIONS

R. J. Modahl and F. C. Hayes, "Evaluation of Commercial Advanced Absorption Heat Pump Breadboard," The Trane Company, pp. 117–125, Aug. 1988.
"Development of a Residential Gas Fired Absorption Heat Pump," Chemical Sector Allied Corporation, pp. 2–1 to 2–9, Aug. 1985.
"Phillips Engineering Gas Space Conditioner," pp. 1–10, and summary page, Nov. 5, 1990.
International Journal of Refrigeration, vol. 9, No. 6, Nov. 1986, pp. 326–333, Scharfe et al., "Analysis of Advantages and Limitations of Absorber–Generator Heat Exchange."B. A. Phillips; "Analyses of Advanced Residential Absorption Heat Pump Cycles"; Proceedings of DOE/ORNL Heat Pump Conference, Washington, D.C.; Dec. 11–13, 1984; pp. 265–287.
B. A. Phillips; "High Efficiency Absorption Cycles for Residential Heating and Cooling"; Intersociety Energy Conversion Eng. Conference, Miami Beach, Florida; Aug. 18–23, 1985; pp. 2.229–2.234.
B. A. Phillips; "A New Future for Absorption?"; ASHRAE Journal; Nov. 1986; pp. 38–42.
B. A. Phillips; "Progress and Problems in Recent Research on Absorption Cycles and Fluids"; U.S.–Israel Workshop, Washington, D.C.; Apr. 23–24, 1987; pp. 89–93.

(List continued on next page.)

Primary Examiner—John M. Sollecito
Attorney, Agent, or Firm—Finnegan, Henderson, Farabow, Garrett & Dunner

[57] ABSTRACT

Numerous embodiments and related methods for generator-absorber heat exchange (GAX) are disclosed, particularly for absorption heat pump systems. Such embodiments and related methods use the working solution of the absorption system for the heat transfer medium where the working solution has an intermediate liquor concentration.

100 Claims, 13 Drawing Sheets

U.S. PATENT DOCUMENTS

| | | |
|---|---|---|
| 3,357,688 | 12/1967 | Whitlow . |
| 3,367,137 | 2/1968 | Whitlow . |
| 3,367,310 | 2/1968 | Whitlow et al. . |
| 3,390,544 | 7/1968 | Eberz . |
| 3,394,926 | 7/1968 | Whitlow et al. . |
| 3,407,625 | 10/1968 | McDonald . |
| 3,410,104 | 11/1968 | Hopkins . |
| 3,423,951 | 1/1969 | Eisberg . |
| 3,466,893 | 9/1969 | Phillips et al. . |
| 3,481,150 | 12/1969 | English . |
| 3,483,710 | 12/1969 | Bearint . |
| 3,491,551 | 1/1970 | Frohbieter . |
| 3,491,552 | 1/1970 | Roeder, Jr. . |
| 3,509,732 | 5/1970 | Roeder, Jr. . |
| 3,517,522 | 6/1970 | Ozono et al. . |
| 3,527,060 | 9/1970 | Kruggel . |
| 3,527,061 | 9/1970 | Kruggel . |
| 3,566,615 | 3/1971 | Roeder, Jr. . |
| 3,584,975 | 6/1971 | Frohbieter . |
| 3,626,716 | 12/1971 | Leonard, Jr. . |
| 3,638,452 | 2/1972 | Kruggel . |
| 3,639,087 | 2/1972 | Frohbieter . |
| 3,641,784 | 2/1972 | Schlichtig . |
| 3,690,121 | 9/1972 | Patel . |
| 3,693,373 | 9/1972 | Gable . |
| 3,717,007 | 2/1973 | Kuhlenschmidt . |
| 3,750,416 | 8/1973 | Kuhlenschmidt . |
| 3,895,499 | 7/1975 | Hopkins . |
| 3,990,264 | 11/1976 | Patnode et al. . |
| 4,031,712 | 6/1977 | Costello . |
| 4,106,309 | 8/1978 | Phillips . |
| 4,127,009 | 11/1978 | Phillips . |
| 4,127,010 | 11/1978 | Phillips . |
| 4,127,993 | 12/1978 | Phillips . |
| 4,171,619 | 10/1979 | Clark . |
| 4,193,268 | 3/1980 | Phillips . |
| 4,207,751 | 6/1980 | Kampfenkel et al. . |
| 4,209,364 | 6/1980 | Rothschild . |
| 4,237,701 | 12/1980 | Holldorff . |
| 4,246,761 | 1/1981 | Phillips et al. . |
| 4,285,211 | 8/1981 | Clark . |
| 4,299,093 | 11/1981 | Cohen et al. . |
| 4,311,019 | 1/1982 | Rojey et al. . |
| 4,329,851 | 5/1982 | Bourne . |
| 4,337,625 | 7/1982 | Wilkinson . |
| 4,383,416 | 5/1983 | Phillips . |
| 4,410,134 | 10/1983 | Heimbach et al. . |
| 4,445,340 | 5/1984 | Reimann . |
| 4,454,724 | 6/1984 | Erickson . |
| 4,463,570 | 8/1984 | Kantner . |
| 4,467,623 | 8/1984 | Reimann . |
| 4,475,361 | 10/1984 | Alefeld . |
| 4,476,694 | 10/1984 | Kunugi . |
| 4,485,638 | 12/1984 | Reimann . |
| 4,505,133 | 3/1985 | Malewski et al. . |
| 4,526,009 | 7/1985 | van der Sluys et al. . |
| 4,531,374 | 7/1985 | Alefeld . |
| 4,534,180 | 8/1985 | Yasuda et al. . |
| 4,542,628 | 9/1985 | Sarkisian et al. . |
| 4,542,629 | 9/1985 | Biermann . |
| 4,545,217 | 10/1985 | Nakao et al. . |
| 4,546,620 | 10/1985 | Biermann . |
| 4,563,295 | 1/1986 | Erickson . |
| 4,563,882 | 1/1986 | Kungi et al. ............... 62/476 |
| 4,567,736 | 2/1986 | van der Sluys et al. . |
| 4,580,407 | 4/1986 | Aime et al. . |
| 4,593,531 | 6/1986 | Fujimoto . |
| 4,596,122 | 6/1986 | Kantner . |
| 4,646,541 | 3/1987 | Reid, Jr. et al. . |
| 4,665,711 | 5/1987 | Page . |
| 4,691,525 | 9/1987 | Gelderloos . |
| 4,691,532 | 9/1987 | Reid et al. . |
| 4,706,464 | 11/1987 | Kreutmair . |
| 4,718,243 | 1/1988 | Buschulte et al. . |
| 4,719,767 | 1/1988 | Reid, Jr. et al. . |
| 4,722,193 | 2/1988 | Purvis et al. . |
| 4,724,679 | 2/1988 | Radermacher . |
| 4,732,008 | 3/1988 | DeVault . |
| 4,735,065 | 4/1988 | Vinz . |
| 4,742,687 | 5/1988 | Reid et al. . |
| 4,742,693 | 5/1988 | Reid, Jr. et al. . |
| 4,763,488 | 8/1988 | Johnston . |
| 4,770,005 | 9/1988 | Alefeld . |
| 4,827,728 | 5/1989 | DeVault et al. . |
| 4,846,240 | 7/1989 | Erickson . |
| 4,894,998 | 1/1990 | Kaneko et al. . |
| 4,921,515 | 5/1990 | Dao . |
| 4,926,659 | 5/1990 | Christensen et al. . |
| 4,938,028 | 7/1990 | Murray . |
| 4,966,007 | 10/1990 | Osborne . |
| 4,966,014 | 10/1990 | Erickson . |
| 4,967,566 | 11/1990 | Bergmann et al. . |
| 5,016,444 | 5/1991 | Erickson . |
| 5,024,063 | 6/1991 | Erickson . |
| 5,033,274 | 7/1991 | Erickson . |
| 5,038,574 | 8/1991 | Osborne . |
| 5,050,392 | 9/1991 | Messmer et al. . |
| 5,050,403 | 9/1991 | Maier-Laxhuber . |
| 5,097,676 | 3/1992 | Erickson . |
| 5,218,843 | 6/1993 | Dao ............... 62/476 |
| 5,490,393 | 2/1996 | Fuesting et al. . |

OTHER PUBLICATIONS

B. A. Phillips; "Development of an Advanced–Cycle Absorption Heat Pump for Residential Applications"; Proceedings of 2nd DOE/ORNL Heat Pump Conference, Washington, D.C., Apr. 17–20, 1988; pp. 111–116; Document prepared by ORNL for DOE, Aug. 1988.

B. A. Phillips; "High Efficiency Absorption Cycles for Residential Heating and Cooling"; pp. 1–6.

B. A. Phillips; "Development of a Gas Fired Heat Pump with an Improved Absorption Cycle"; ASME winter annual Meeting, Nov. 27–Dec. 2, 1988; Chicago, Illinois.

Columbia Double–Effect Absorption Gas Heat Pump, Market and Technology Prospectus; Columbia Gas System Services Corp., Columbus, Ohio, Feb., 1990.

B. A. Phillips; "Development of a High Efficiency, Gas–Fired, Absorption Heat Pump for Residential and Small–Commercial Applications–Phase I Final Report Analysis of Advanced Cycles and Selection of the Preferred Cycle"; Oak Ridge National Laboratory, Sep., 1990.

Dr. Benjamin A. Phillips; "Absorption Cycles for Air–Cooled Solar Air Conditioning", St. Joseph, Michigan, 1976.

GENERATOR-ABSORBER HEAT EXCHANGE TRANSFER APPARATUS AND METHOD USING AN INTERMEDIATE LIQUOR

GOVERNMENT RIGHTS

This invention was made with Government support under contract 86X-17497C awarded by the Department of Energy. The Government has certain rights in this invention.

RELATED APPLICATIONS

The present application is a continuation-in-part of application Ser. No. 08/076,759, filed on Jun. 15, 1993, now U.S. Pat. No. 5,367,884 which application was a continuation-in-part of application Ser. No. 07/793,644, filed on Nov. 18, 1991, now U.S. Pat. No. 5,271,235. The disclosures of each of these applications is incorporated by reference herein.

BACKGROUND OF THE INVENTION

1. Field of the Invention

The present invention relates to refrigeration and heat pump systems and more particularly to an absorption refrigeration cycle of the generator-absorber heat exchange ("GAX") type. The invention is especially adapted for use in a gas-fired, air-to-air, absorption heat pump.

2. Description of Related Art

Absorption refrigeration cycles were developed in the mid 1800's and were used primarily in refrigeration systems. Such cycles operated by using a refrigerant/absorbent mixture, the refrigerant vapor being absorbed in an absorber into a liquid absorbent, thus producing heat, followed by heating the refrigerant/absorbent mixture in a generator to drive off the refrigerant vapor. A condenser, which also produced heat, and an evaporator, which extracted heat, completed the cycle. The heat produced by absorption in the absorber was discarded, along with that from the condenser, to a coolant, generally cooling water.

These early "single stage" absorption cycle systems were energy inefficient but were often preferred to compression systems, before the advent of electric motors, because the cost of heat energy to operate them was low and they required much less mechanical energy than compression systems. For most applications, the use of these single stage absorption systems declined with changes in the relative cost of gas and electric energy and improvements in electrically operated compression systems. However, even today, these relatively inefficient single stage systems are still in use in low pressure lithium bromide commercial air conditioning systems and in refrigeration systems for recreational vehicles and hotel rooms.

In 1913, an improved absorption cycle was devised by Altenkirch. This cycle was made more efficient than the early single stage cycles by transferring a portion of the heat produced in the absorber to the refrigerant/absorbent fluid circulated to the generator, and transferring to the generator a portion of the heat in the absorbent flowing from the generator to the absorber. This transfer of heat reduced the heat input required to the generator to evaporate the refrigerant from the refrigerant/absorbent mixture. This system has been called the absorber heat exchange (AHE) system.

The AHE cycle was used in the early 1960's to produce absorption systems that were efficient enough to be cost effective air conditioners at that time. The AHE cycle has been used in residential, air cooled air conditioners, starting in 1965. However, even in these AHE systems, a large portion of the heat generated by the absorption process in the absorber was lost. The AHE cycle was also used experimentally in air-to-air gas heat pumps, which were also advantageous in heating, but were never commercially produced. As energy costs have increased, the AHE air conditioners have lost much of their operating cost advantages and today, have only a limited market.

Also in 1913, Altenkirch devised another absorption cycle that recovered more of the heat of absorption from the absorber. This cycle, which has come to be known as the generator-absorber heat exchange (GAX) cycle, utilized an additional heat exchange system, whereby high temperature heat produced by the absorption process in the absorber was transferred via a heat exchange fluid to the generator. This GAX cycle concept is capable of recovering an additional large amount of heat from the absorber and capable of utilizing higher generator temperatures than the AHE system and thus is capable of achieving much higher energy efficiencies. The heating efficiency of such GAX systems, relative to the particular fuel used, can be much higher than that of furnaces, boilers, etc.

However, prior art GAX cycle systems suffered from the disadvantage that a separate heat transfer circuit using a separate heat transfer fluid was required. This heat transfer circuit had to be hermetic, required an expansion chamber, required a hermetic pump capable of variable flow, and required a system to control the amount of flow of the heat transfer fluid to match the GAX heat to be transferred in either the cooling or heating cycle at the particular outdoor temperature. Also, using a fluid in the heat transfer circuit different from the working fluid created the danger of cross-contamination between the heat transfer circuit and the absorber or generator. These prior art GAX systems typically used a heat transfer fluid that remained in the liquid phase and thus could only use the sensible heat of the heat transfer liquid.

Electric heat pumps, which operate with a standard condenser-evaporator cycle, have heretofore been utilized for residential and small commercial heating and cooling applications. However, while electric heat pumps can effectively satisfy the heating and cooling requirements of residential and small commercial buildings in areas having relatively warm climates, such as the southern states of the United States, these electric heat pumps are not capable of providing, without auxiliary heating equipment, the necessary heating in climates where the temperatures drop below about 30° F. In addition, these electric heat pump systems typically use refrigerants that may be hydrochlorofluorocarbons (HCFC's) or chlorofluorocarbons (CFC's), which are environmentally hazardous.

Thus, the need exists for a generator-absorber heat exchange apparatus and method suitable for use in a residential or small commercial heat pump that efficiently transfers a large portion of the heat produced by the absorption process in the absorber to the generator without the use of a costly, possibly failure prone, independent heat transfer circuit.

The instant invention satisfies that need by providing a generator-absorber heat exchange apparatus and method that can use an environmentally safe fluid as both the working fluid and the heat exchange fluid, that efficiently recovers a large proportion of the heat generated by the absorption process in the absorber, that does not require an elaborate system of controls, that advantageously may use either or both the latent heat and the sensible heat of the working fluid to transfer heat from the absorber to the generator by operating between its vapor and liquid phases, and that, because of size, cost and efficiency, can be used to satisfy residential and commercial heating and cooling requirements over a wide range of climates, including sufficient heating at temperatures below 0° F.

Additional features and advantages of the invention will be set forth in the drawings and written description which follow, and in part will be apparent from the drawings and written description or may be learned from the practice of the invention. The advantages of the invention will be realized and attained by the generator-absorber heat exchange apparatus, the heat pump incorporating the generator-absorber heat exchange apparatus and the method for transferring heat between an absorber and generator in a generator-absorber heat exchange apparatus, particularly pointed out in the drawings, written description and claims hereof.

SUMMARY OF THE INVENTION

To achieve these and other advantages, and in accordance with the purpose of the invention as embodied and broadly described herein, the present invention, in one aspect, provides a generator-absorber heat exchange apparatus that includes a generator and an absorber. The absorber has an interior pressure lower than the interior pressure of the generator and each has high and low temperature regions at opposite ends establishing respective temperature ranges. The temperature ranges of the generator and absorber define respective overlapping heat transfer regions. A fluid flow pathway is provided for circulating a liquor having rich, intermediate and weak concentrations of refrigerant to and through the high temperature, heat transfer and low temperature regions of the generator and the absorber. The improvement to the generator-absorber heat exchange apparatus in accordance with the invention, as embodied and broadly described herein, comprises a heat exchange circuit receiving at least a portion of the liquor from the fluid flow pathway at a location where the liquor has an intermediate liquor concentration. The heat exchange circuit also circulates that portion of the liquor between the heat transfer regions of the absorber and the generator to transfer heat from the absorber to the generator.

In a preferred embodiment, the heat exchange circuit further comprises a heat exchange element disposed in the heat transfer region of the absorber and a conduit conducting the portion of the liquor from the fluid flow pathway through the heat exchange element and between heat transfer regions.

In a further preferred embodiment, the heat exchange circuit further comprises a plurality of heat exchange elements, at least one being disposed in the heat transfer region of each of the generator and absorber, and a conduit conducting the portion of the liquor from the fluid flow pathway serially to each heat exchange element alternately between heat transfer regions.

In accordance with another aspect of the invention, the heat exchange circuit preferably includes an input end in fluid communication with the fluid flow pathway. The input end is in fluid communication with the fluid flow pathway at a location where the liquor has an intermediate liquor concentration. The heat exchange circuit may also comprise an output end for distributing the portion of intermediate liquor circulated between heat transfer regions within either the generator or absorber. The liquor circulated between heat transfer regions of the generator and absorber may be substantially in the liquid state or may be a two phase mixture of liquid and vapor in at least a portion of the heat exchange circuit.

The present invention, in another aspect, comprises a generator-absorber heat exchange apparatus that includes a generator containing a liquor having a concentration gradient that is rich proximate an upper end, weak proximate a lower end and intermediate therebetween, and a temperature gradient extending from low proximate the upper end to high proximate the lower end with a heat transfer region therebetween. The generator-absorber heat exchange (GAX) apparatus in this aspect of the invention also includes an absorber having a pressure in its interior lower than the interior pressure of the generator and containing a liquor having a concentration gradient that is weak proximate an upper end, rich proximate a lower end and intermediate therebetween, and a temperature gradient extending from high proximate the upper end to low proximate the lower end with a heat transfer region therebetween. The GAX apparatus in this aspect also includes a rich liquor conduit having an inlet in fluid communication with the absorber proximate the lower end thereof and an outlet disposed in the generator proximate the upper end thereof distributing rich liquor from the lower end of the absorber for passage along the concentration and temperature gradients of the generator. A pump in fluid communication with the rich liquor conduit is also provided for moving fluid through the conduit between the absorber and the generator. A weak liquor conduit is provided having an inlet in fluid communication with the generator proximate the lower end thereof and an outlet disposed in the absorber proximate the upper end thereof distributing weak liquor from the lower end of the generator for passage along the concentration and temperature gradients of the generator. A heater is disposed to heat liquor in the generator proximate the lower end thereof. The GAX apparatus in this aspect of the invention also includes a heat exchange circuit comprising:

- at least one heat exchange element in the heat transfer region of the absorber, the heat transfer regions of the generator and absorber having overlapping temperatures; and
- a heat exchange conduit having an input end receiving liquor from at least one of the absorber and generator at a location where the liquor has an intermediate concentration and conveying the liquor between the heat transfer regions of the absorber and the generator for heat transfer therein. The heat exchange conduit may also have an output end distributing the liquor in one of the absorber and generator.

The present invention also provides, in another aspect, a heat pump comprising an indoor liquid to air heat exchanger, an outdoor liquid to air heat exchanger, the generator-absorber heat exchange apparatus and an antifreeze circuit. The antifreeze circuit in accordance with this aspect of the invention circulates antifreeze fluid between the indoor and outdoor heat exchangers and the generator-absorber heat exchange apparatus for selectively extracting heat from one of the heat exchangers and transferring heat to the other of the heat exchangers.

In accordance with another aspect of the present invention, a method is provided for transferring heat between an absorber and a generator in a generator-absorber heat exchange apparatus. This heat transfer is accomplished by circulating an intermediate liquor between a heat transfer region of the absorber and a heat transfer region of the generator. As mentioned above, the heat transfer region of the generator and the heat transfer region of the absorber have temperature gradients including a common temperature range.

In accordance with another aspect of the invention, a method is provided for transferring heat between a region of low temperature and a region of medium temperature using the generator-absorber heat exchange apparatus of the invention. This method comprises circulating an antifreeze fluid between an indoor heat exchanger and at least one of an absorber heat exchanger, a condenser heat exchanger and a generator heat exchanger, thereby transferring heat via the antifreeze fluid from the at least one absorber, condenser and generator heat exchanger to the indoor heat exchanger. The method also comprises circulating an antifreeze fluid between an outdoor heat exchanger and an evaporator heat exchanger, thereby transferring heat via the antifreeze fluid from the outdoor heat exchanger to the evaporator heat exchanger.

In accordance with another aspect of the invention, a method is provided for transferring heat between a region of high temperature and a region of medium temperature using the generator-absorber heat exchange apparatus of the invention. This method comprises circulating an antifreeze fluid between an outdoor heat exchanger and at least one of an absorber heat exchanger, a condenser heat exchanger and a generator heat exchanger, thereby transferring heat via the antifreeze fluid from the at least one absorber, condenser and generator heat exchanger to the outdoor heat exchanger. The method also comprises circulating an antifreeze fluid between an indoor heat exchanger and an evaporator heat exchanger, thereby transferring heat via the antifreeze fluid from the indoor heat exchanger to the evaporator heat exchanger.

Although the invention is illustrated as embodied in a gas-fired residential heat pump, the invention as broadly claimed is not so limited and its benefits and advantages apply equally to other heating and refrigeration processes. The above and other advantages and features of this invention will become apparent upon review of the following specification in conjunction with the drawings.

DETAILED DESCRIPTION OF THE PREFERRED EMBODIMENTS

In accordance with the invention, the term "weak liquor" as used herein refers to the liquor in the high temperature region, i.e., the bottom portion, of the generator. The term "rich liquor" as used herein refers to the liquor in the low temperature region, i.e., the bottom portion, of the absorber. As used herein, the term "intermediate liquor" refers to a liquor that has a concentration of refrigerant that is less than the rich liquor concentration but greater than the weak liquor concentration. The various intermediate liquors are present in the absorber and/or the generator. The terms "weak," "intermediate" and "rich" refer to the relative concentration of the absorbed component(s), i.e., refrigerant, to the concentration of the absorbent component(s), i.e., water. Thus, a weak liquor liquid has less absorbed refrigerant, such as ammonia, and more absorbent, such as water, than an equal amount of a rich liquor liquid.

As noted above, both the absorbed component(s) and the absorbent component(s) constituting the weak liquor, intermediate liquor and rich liquor may be in either a vapor or liquid state or a combination of the two. Also, the term "heat pump" as used herein is intended to include any apparatus that transforms heat between low, medium and high temperature states and is intended to include not only the commonly understood meaning of the term, but also as used herein is intended to include heat transformers as well as more traditional systems such as refrigeration, air conditioning, and related processes.

Figure 1:
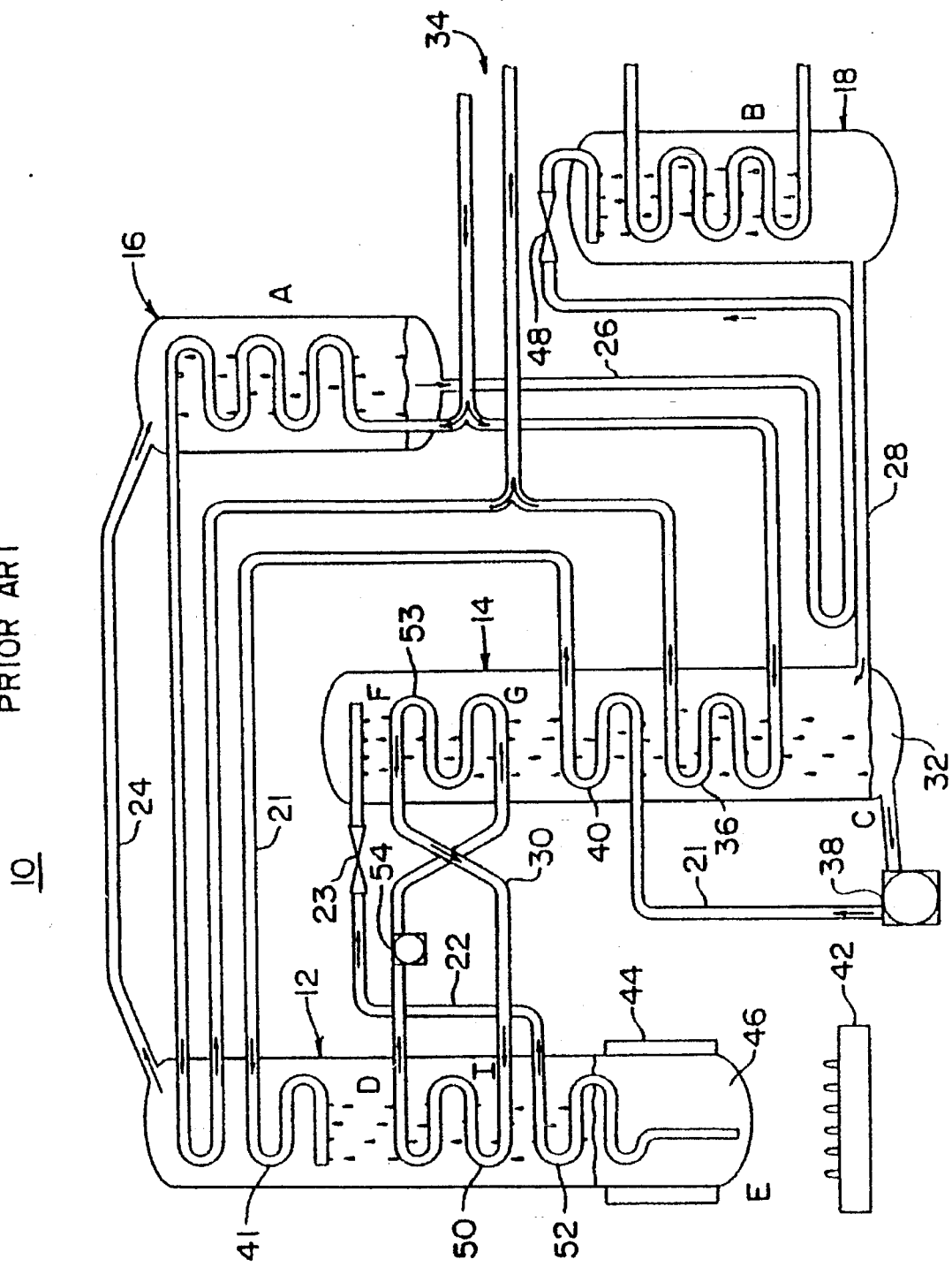
FIG. 1 is a flow diagram illustrating an absorption apparatus using a conventional generator-absorber, heat-exchange (GAX) circuit.

In the known prior art system illustrated in FIG. 1, a generator-absorber heat exchange apparatus 10 operating on the generator-absorber heat exchange (GAX) cycle generally comprises a generator 12, an absorber 14, a condenser 16, an evaporator 18, a solution pump 38, and working fluid pathways for circulation of a refrigerant/absorbent liquor to and through generator 12 and absorber 14 and circulation of a refrigerant liquor through condenser 16 and evaporator 18. In particular, the refrigerant/absorbent liquor pathway includes a rich liquor pathway 21 providing fluid communication of rich liquor 32 from a low temperature region C of absorber 14 to a low temperature region D of generator 12, and a weak liquor pathway 22 providing fluid communication of weak liquor 46 from a high temperature region E of generator 12 to a high temperature region F of absorber 14. The refrigerant/absorbent liquor pathway is completed by passage of liquor from weak liquor pathway 22 through high temperature, intermediate temperature and low temperature regions F, G, C of absorber 14 and by passage of liquor from rich liquor pathway 21 through low temperature, intermediate temperature and high temperature regions D, I, E of generator 12. The working fluid pathway is completed from generator 12 to condenser 16 through conduit 24, from condenser 16 to evaporator 18 through conduit 26, and from evaporator 18 to absorber 14 through conduit 28.

The terms "low temperature region," "intermediate temperature region" and "high temperature region" as used herein are meant to refer to relative temperatures. As depicted in FIG. 1, each region will be defined by a range of temperatures which in each particular component is relatively higher or lower than the other region. Thus, for example, high temperature region E of generator 12 might have a temperature of around 400° F. and low temperature region D of generator 12 might have a temperature of around 200° F. On the other hand, high temperature region F of absorber 14 might have a temperature of around 300° F. and low temperature region C of absorber 14 might have a temperature of around 100° F. In each of generator 12 and absorber 14 there is an area of overlapping temperature termed herein the heat transfer region. This heat transfer region is depicted in FIG. 1 as the area between regions D and I of generator 12 and the area between regions G and F of absorber 14.

An absorption generator for use with ammonia/water (or other fluid where the absorbent is volatile) is, in essence, a distillation column, which has a stripping section and a rectifying section. The stripping section is the lower, hotter section corresponding to the portion between regions D and E, while the rectifier section is the upper, cooler section corresponding to the portion above region D. The dividing point between the stripping and rectifying sections, region D, is the region of the generator that has a temperature corresponding to the boiling point of the rich liquor liquid at the generator pressure. As used herein, the term "generator" commonly refers to the stripping section, and the terms "high temperature region" and "low temperature region" when referring to the generator apply to regions E and D of the stripping section, respectively.

As depicted in FIG. 1, the vertical temperature gradients of absorber 14 and generator 12 are reversed, i.e., the highest temperature region E of generator 12 is at or near its lower, or bottom end, whereas the highest temperature region F of absorber 14 is at or near its upper end. Thus, the orientation of the respective heat transfer regions D-I and G-F is similarly opposite. The temperature range defining heat transfer regions D-I and G-F is within the temperature overlap between the temperature range of generator 12 and the temperature range of absorber 14, which may be within the range of, for example, about 200° F. to about 300° F. (at the conditions used for rating heat pumps in the United States).

The known apparatus depicted in FIG. 1 includes a heat transfer circuit 30 disposed between heat transfer regions D-I and G-F of generator 12 and absorber 14, which is oriented so as to conduct fluid directly between areas of the heat transfer regions.

During operation of the known system of FIG. 1, a low pressure refrigerant, consisting primarily of a refrigerant, such as ammonia, but possibly containing a small amount of absorbent, especially if the absorbent is volatile, as is water, exits evaporator 18 mostly as a vapor and passes through conduit 28 to absorber 14 at low temperature region C. This refrigerant vapor rising upward through absorber 14 is absorbed into a countercurrent flow of weak liquor, thus producing a rich liquor 32 that accumulates in the liquid state at low temperature region C of absorber 14. This process takes place at a temperature above that of the surroundings, generating heat, some of which is transferred to air, water, antifreeze or other heat transfer fluid circulating during this process through heat exchanger 36 located in a heat exchange circuit 34.

Rich liquor 32 is then transferred along rich liquor pathway 21 by a rich liquor pump 38 to region D of generator 12, where a higher pressure is maintained. A higher pressure is maintained in generator 12 than in absorber 14. For example, the pressure in generator 12 may commonly be around 240–400 psia and the pressure in absorber 14 may be around 15–80 psia, depending on the operating temperature. In accordance with the absorber heat exchange (AHE) cycle principle, heat exchanger 40 in rich liquor pathway 21 is used to transfer absorber heat to rich liquor 32. In one alternative, rich liquor 32 is heated in heat exchanger 40 essentially to its boiling point at the pressure of generator 12 and provided as a heat input to region D of generator 12. Alternatively, as shown in FIG. 1, rich liquor 32 is heated in heat exchanger 40 to a temperature below its boiling point and thereafter is heated in heat exchanger 41 in the rectifier section above region D of generator 12. In either alternative, rich liquor 32 is distributed within generator 12 at region D.

Heat source 42 and heat transfer fins 44 cooperate to heat rich liquor 32 as it passes downward through generator 12, thereby driving off refrigerant vapor from rich liquor 32 to form weak liquor 46 at high temperature region E of generator 12. Vapor having a concentration of near 100% refrigerant is expelled from generator 12 through refrigerant pathway 24 to condenser 16 where it is condensed and fed via conduit 26 through restriction means 48 to a lower pressure in evaporator 18. Weak liquor 46 in high temperature region E of generator 22 is returned through weak liquor pathway 22 through restriction means 23 to high temperature region F of absorber 14. The sensible heat of weak liquor 46 is provided as a heat input to generator 12 at heat exchanger 52. Heat may also be transferred in a heat exchanger (not shown) between rich liquor pathway 21 and weak liquor pathway 22.

In the known generator-absorber heat exchange system illustrated in FIG. 1, heat transfer is performed by a GAX heat transfer circuit 30, including, for example, a pair of heat exchange coils 50 and 53 and a pump 54 to circulate heat transfer fluid such as pressurized water. Since the vertical temperature gradients of absorber 14 and generator 12 are reversed, it is necessary to cross-connect the pathways between coils 50 and 53, as illustrated in FIG. 1.

Figure 2:
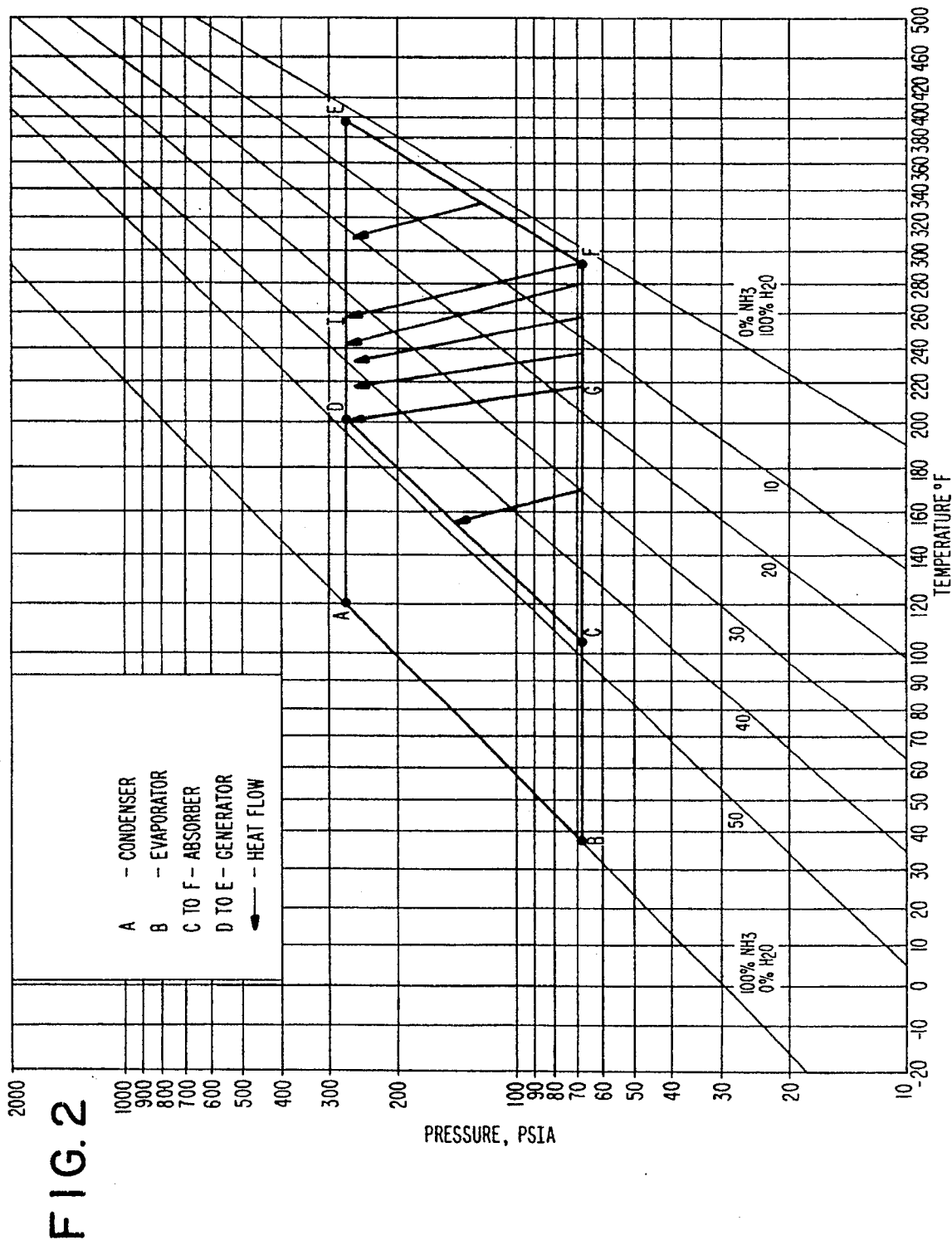
FIG. 2 is a pressure-temperature-composition (P-T-X) diagram of the system in FIG. 1.

The principle of the GAX cycle is illustrated in the pressure-temperature-composition diagram of FIG. 2 in which point D represents the dividing point between the stripping and rectifying sections of generator 12, point E represents the high temperature region of generator 12, point C represents the low temperature region of absorber 14, point F represents the high temperature region of absorber 14, point I represents the region of generator 12 that is at a temperature lower than the temperature of point F in absorber 14 by an amount sufficient to provide the necessary temperature difference for heat transfer between those regions, and point G represents the region of absorber 14 that is at a temperature higher than the temperature of point D in generator 12 by an amount sufficient to provide the necessary temperature difference for heat transfer between those regions. These regions in FIG. 2 correspond to regions D, E, C, F, I and G, respectively, in FIG. 1.

In FIG. 2, line D-I represents the heat transfer region of generator 12 and line G-F represents the heat transfer region of absorber 14. Points A and B represent the condenser 16 and evaporator 18, respectively. The line from C to D represents rich liquor pathway 21 and the line from E to F represents weak liquor pathway 22. The multiple arrows in FIG. 2 extending from the G-F line to the D-I line indicate heat transfer from the heat transfer region of absorber 14 to the heat transfer region of generator 12. The single arrows extending from the line EF to the line IE and from the line CG to the line CD indicate heat transfer from heat exchanger 52 to generator 12 and from absorber 14 to heat exchanger 40, respectively.

The heat to be transferred from absorber 14 to generator 12 is available over a temperature range in absorber 14 and should be transferred to a temperature range in generator 12 that is cooler only by the temperature differential required to transfer the heat. To do this most efficiently, the heat from the hottest segment of heat transfer region F of absorber 14 should be transferred to the hottest segment of heat transfer region I in generator 12, and similarly for each of the progressively cooler segments of heat transfer regions of absorber 14 and generator 12. This means that the heat transfer fluid temperature range must fit between the heat transfer region temperature ranges of generator 12 and absorber 14, and each of the segments.

In accordance with the present invention, as embodied and broadly described herein, a heat exchange circuit is provided in a generator-absorber heat exchange apparatus that includes a generator and an absorber. The absorber has an interior pressure lower than the pressure of the generator interior and each of the generator and absorber has high and low temperature regions with vertically opposed temperature gradients and a heat transfer region. The temperature ranges defining the respective heat transfer regions overlap. The generator-absorber heat exchange apparatus includes a fluid flow pathway for circulation of a liquor having rich, intermediate and weak concentrations of refrigerant to and through the high temperature, heat transfer and low temperature regions of the generator and absorber.

Like copending application Ser. No. 08/076,759, the present invention provides various embodiments and methods for performing GAX heat transfer in a generator-absorber heat exchange apparatus using the refrigerant/absorbent working fluid of the system. However, unlike the copending application, which uses the weak liquor, rich liquor or a combination thereof as the heat transfer medium, the present application uses intermediate liquor as the heat transfer medium. In principle, any absorbent/refrigerant liquor composition having an intermediate liquor concentration can be used in accordance with the invention. As mentioned earlier, as used herein, the term "intermediate liquor" refers to a liquor that has a concentration of refrigerant that is less than the rich liquor concentration but greater than the weak liquor concentration. The intermediate liquors are present in the generator and absorber and can be extracted from either, but as indicated hereinafter, some intermediate liquors can be more advantageously used for purposes of the invention than others.

The apparatus of the present invention includes a heat exchange circuit that receives at least a portion of the liquor from the fluid flow pathway at a location where the liquor has an intermediate liquor concentration and circulates the intermediate liquor between the heat transfer regions of the absorber and the generator to transfer heat from the absorber to the generator. The term "heat transfer region" as used herein is intended to include not only regions in the interior of the generator and absorber having overlapping temperatures, but also those regions adjacent to or in heat transfer contact with the interior of the generator and absorber having overlapping temperatures. The transfer should preferably be provided over the full overlap temperature range.

In accordance with the invention, as embodied and broadly described herein, the heat exchange circuit comprises at least one heat exchange element in the heat transfer region of the absorber and a conduit conducting a portion of the intermediate liquor from the fluid flow pathway through the heat exchange element and between heat transfer regions. The heat exchange circuit of the invention may include a plurality of heat exchange elements, at least one being disposed in the heat transfer region of each of the generator and absorber with a conduit conducting the intermediate liquor from the fluid flow pathway serially to each heat exchange element alternately between heat transfer regions. There may be anywhere from one to up to four or more heat exchange elements in each of the generator and absorber depending upon the particular embodiment of the invention. The term "heat exchange element" as used in accordance with the invention refers to any apparatus or device that is capable of providing for the exchange of heat between fluids, such as a heat exchange coil.

In accordance with the invention, as embodied and broadly described herein, the motive force for circulating the liquor in the heat exchange circuit is preferably provided by a pump, but may also be provided in some instances by a liquid head. The heat exchange circuit also preferably includes an input end in fluid communication with the fluid flow pathway for withdrawing intermediate liquor from the fluid flow pathway and an output end for distributing the liquor within either the generator or absorber.

In accordance with the invention, as embodied and broadly described herein, an input end is provided in fluid communication with the fluid flow pathway at a location where the liquor has an intermediate liquor concentration, thus using the intermediate liquor as the heat transfer medium. This input end is preferably located in either the generator or absorber and may consist of any suitable device for accumulating a liquid. Several embodiments of the invention, as illustrated by FIGS. 3, 4, 6 and 7, have an input end located in the generator. Other embodiments, illustrated by FIGS. 9, 10, 11 and 12, have an input end located in the absorber.

Figure 9:
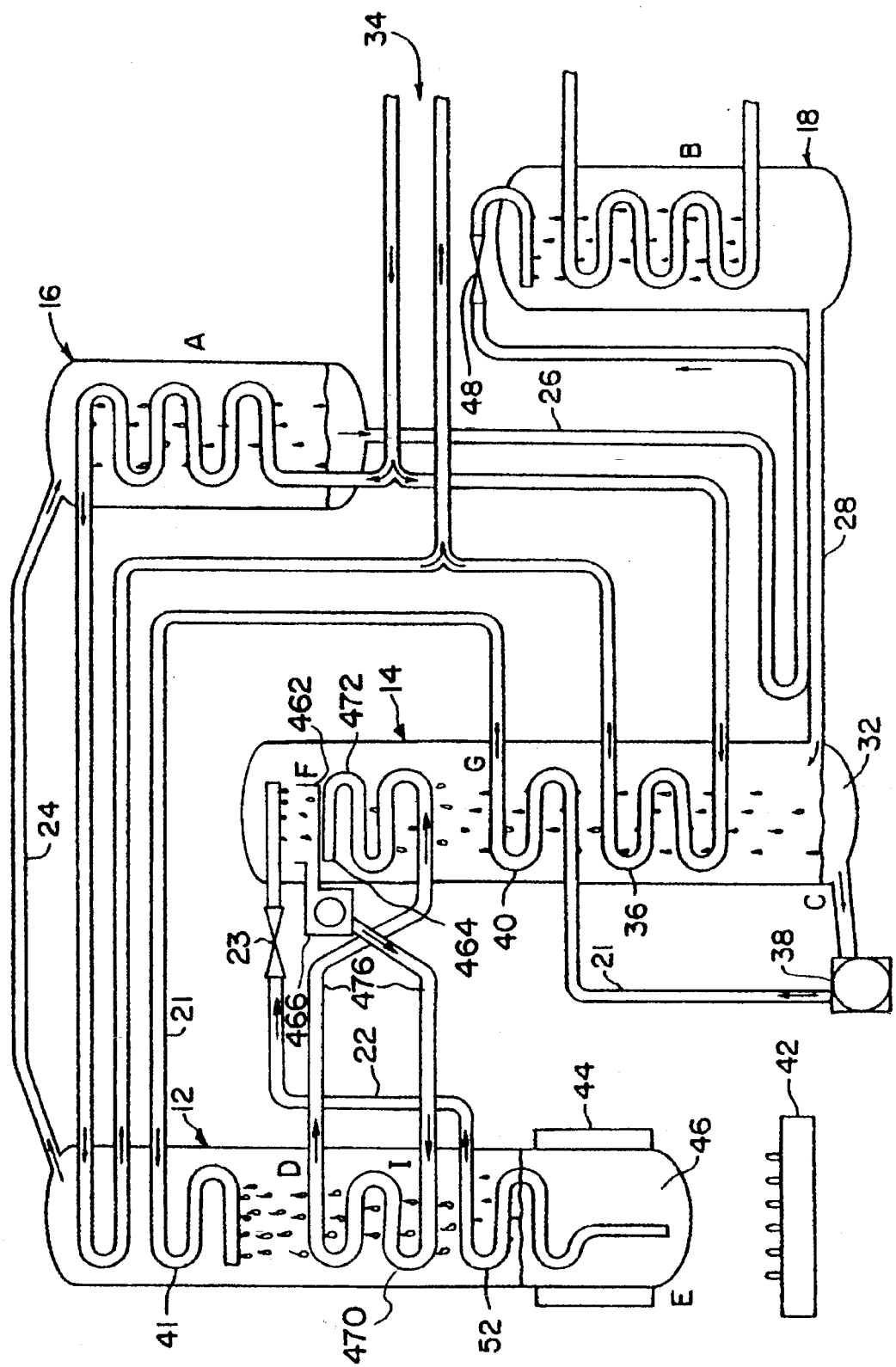
FIG. 9 is a flow diagram of a fifth embodiment of the GAX apparatus of the present invention.
Figure 10:
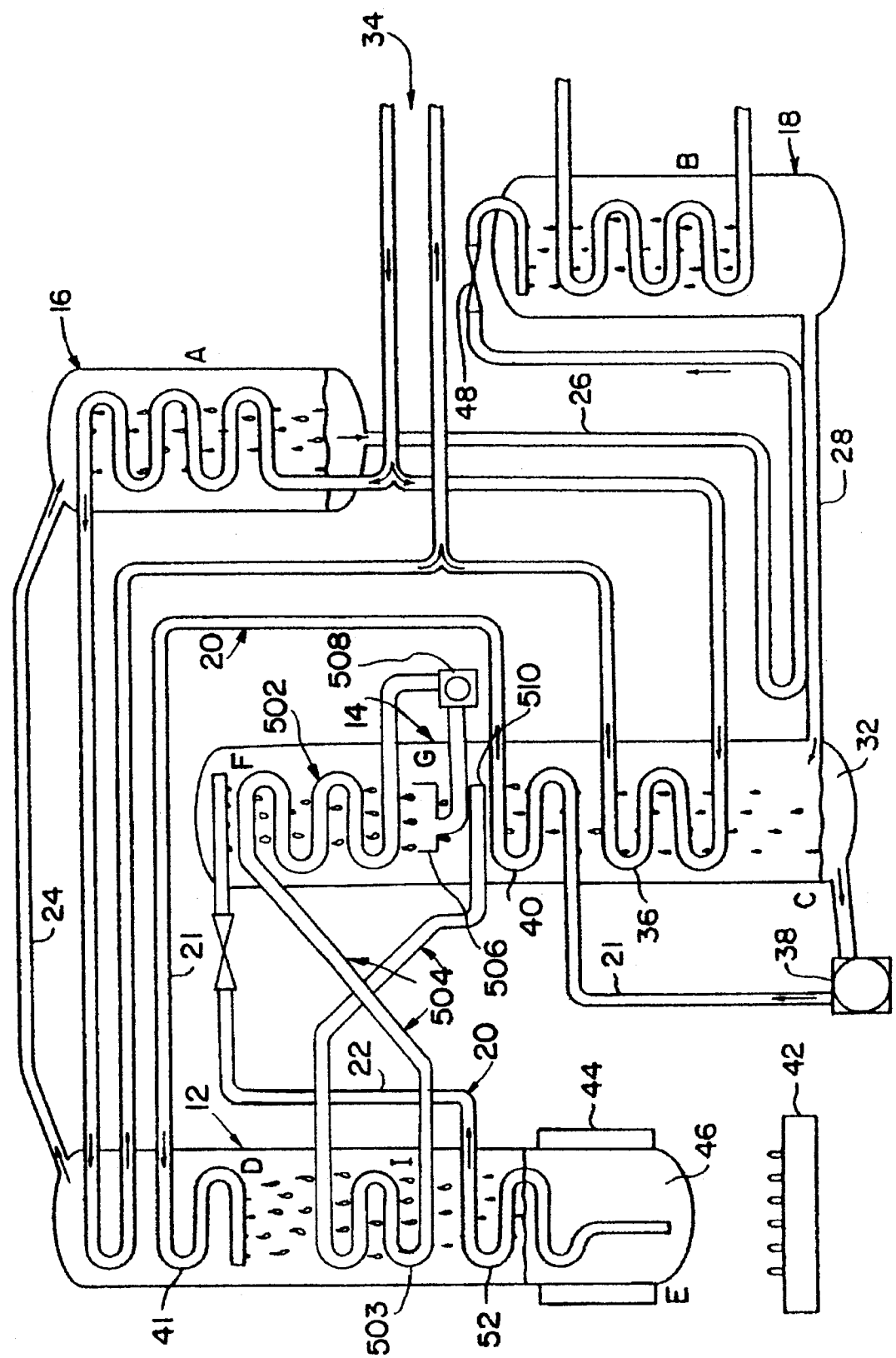
FIG. 10 is a flow diagram of a sixth embodiment of the GAX apparatus of the present invention.

The present invention, as illustrated in FIGS. 3, 6, 7, 9, 10, 11 and 12, may include an output end for the heat exchange circuit to distribute the portion of the liquor circulated between heat transfer regions into either the generator, as shown in FIGS. 3, 6, 7, 11 and 12, or the absorber, as shown in FIGS. 9 and 10. This output end may be any device capable of distributing a liquid or a vapor/liquid mixture, such as a distributor in the case of a liquid, or a separator/distributor in the case of vapor/liquid mixtures, and is preferably located at a region of the generator or absorber at substantially the same temperature and pressure at which the intermediate liquor enters.

Several embodiments of the invention, as illustrated by FIGS. 3, 4, 9 and 12, use a substantially single liquid phase working fluid as the heat transfer medium and thus use the sensible heat of the working fluid. Other embodiments of the invention, as illustrated by FIGS. 6, 7, 10, and 11, use a working fluid as the heat transfer medium that is a two phase liquid/vapor mixture in at least a portion of the heat exchange circuit and thus take advantage of the latent heat of the working fluid.

Figure 3:
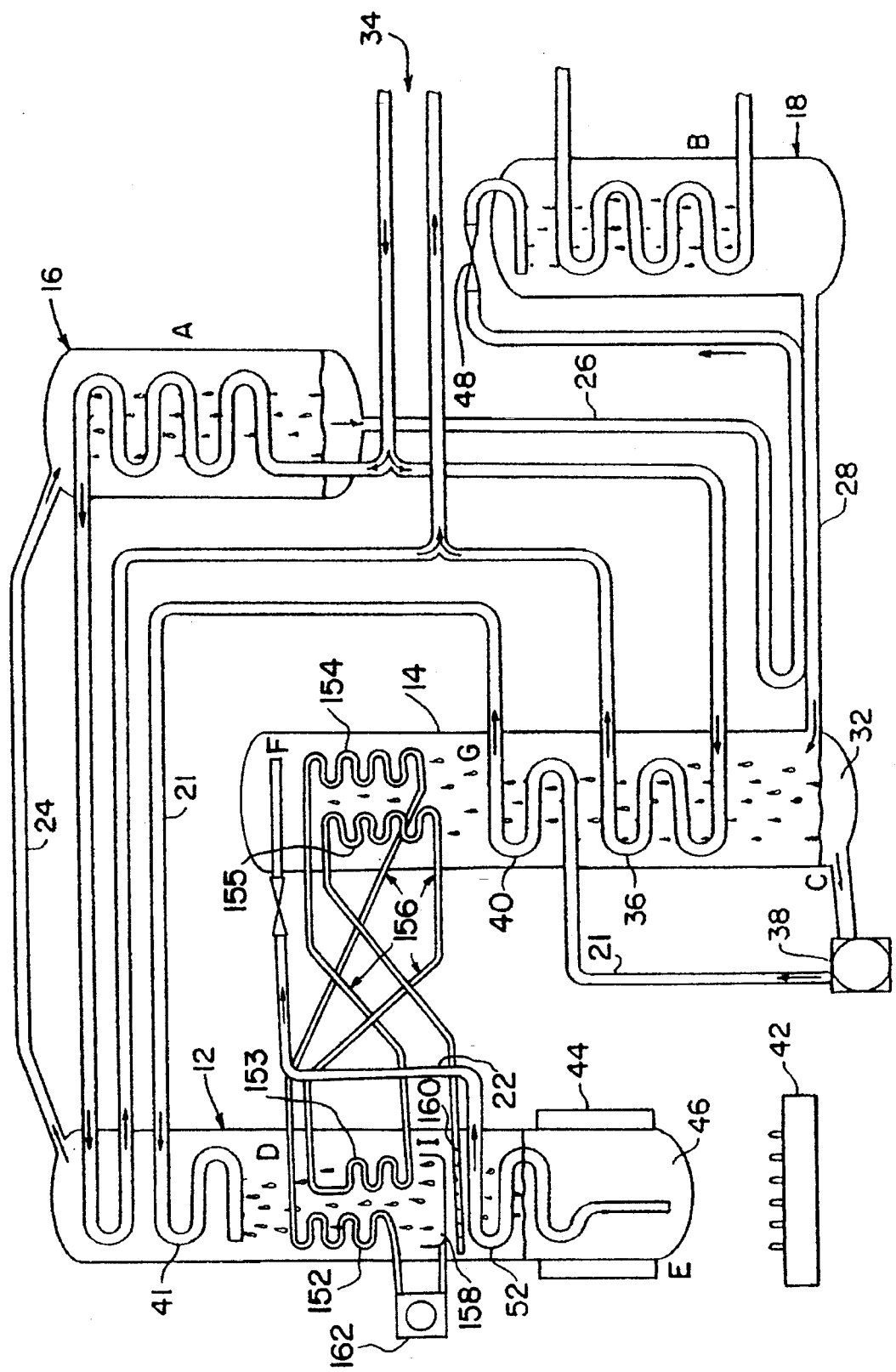
FIG. 3 is a flow diagram of a first embodiment of the GAX apparatus of the present invention.

One embodiment of the invention illustrated by FIG. 3 uses a substantially single liquid phase working fluid taken from the generator as the heat transfer fluid, thus using the sensible heat of the working fluid. Referring specifically to FIG. 3, a generator-absorber heat exchange apparatus 150 is illustrated. In this embodiment, the heat exchange circuit comprises two heat exchange coils 152 and 153 located in the heat transfer region of generator 12 and two heat exchange coils 154 and 155 located in the heat transfer region of absorber 14. A heat exchange conduit 156 is provided which includes an input end disposed to withdraw intermediate liquor from a location preferably at or near region I of generator 12 and an output end for distributing the intermediate liquor into generator 12, which in this embodiment is distributor 160. The input end in FIG. 3 is shown as liquid accumulator 158, and may be any means to collect intermediate liquor liquid in the interior of generator 12, preferably at or below region I. Preferably, liquid accumulator 158 is located just above distributor 160. Heat exchange conduit 156 serially interconnects generator heat exchange coils 152 and 153 and absorber heat exchange coils 154 and 155 to conduct the intermediate liquor alternately between heat transfer regions of generator 12 and absorber 14.

In accordance with this embodiment of the invention, heat exchange circuit pump 162 is preferably used to extract intermediate liquor from liquid accumulator 158 and to circulate the intermediate liquor between heat exchange coils 152 and 153 in generator 12 and heat exchange coils 154 and 155 in absorber 14. The intermediate liquor exits heat exchange circuit pump 162 and enters heat exchange coil 152 where heat is transferred from the intermediate liquor to the interior of generator 12. After exiting heat exchange coil 152, the intermediate liquor is circulated through heat exchange conduit 156 and directed to heat exchange coil 154 in absorber 14, where heat is transferred from the interior of absorber 14 to the intermediate liquor. After exiting heat exchange coil 154, the intermediate liquor is circulated via heat exchange conduit 156 to heat exchange coil 153 in generator 12, where heat is transferred from the intermediate liquor to the interior of generator 12. The intermediate liquor then exits heat exchange coil 153 and is circulated via heat exchange conduit 156 to heat exchange coil 155 in absorber 14, where heat is transferred from the interior of absorber 14 to the intermediate liquor. The intermediate liquor is then circulated from the exit of heat exchange coil 155 via heat exchange conduit 156 to distributor 160 in generator 12. Distributor 160 is preferably located just below liquid accumulator 158 at or near region I of generator 12. The amount of recirculation between heat exchange coils 152, 153, 154 and 155 is determined by the design of heat exchange circuit pump 162 and the pressure drop through heat exchange coils 152, 153, 154 and 155 and heat exchange conduit 156. The maximum amount of intermediate liquor that can be recirculated is the amount of intermediate liquor flowing in generator 12 at or near region I.

As mentioned, the state of the intermediate liquor in this embodiment is substantially all liquid. The amount of flow of intermediate liquor between heat exchange coils 152 and 153 and heat exchange coils 154 and 155 may be the total flow of intermediate liquor in generator 12 at or near region I, or may be controlled by collecting less than the total amount of flow to increase the temperature range of heat transferred from absorber 14 to generator 12.

In accordance with the invention and as an alternative to the embodiment illustrated in FIG. 3, liquid accumulator 158 and distributor 160 can be combined into a single accumulator/distributor. The accumulator/distributor can be any device that is capable of collecting, accumulating and distributing the intermediate liquor liquid in generator 12. For example, the accumulator/distributor could be a basin that collects and accumulates intermediate liquor liquid flowing through generator 12. The basin could be provided with a series of distributing tubes extending through the bottom of the basin, with the tops of the tubes at a predetermined level in the basin, so that when the level of intermediate liquor liquid reaches the tops of the tubes, the liquid overflows out of the basin and is distributed into generator 12. The intermediate liquor returning to generator 12 from heat exchange coil 155 would flow via heat exchange conduit 156 into the accumulator/distributor.

The use of an accumulator/distributor in the embodiment of FIG. 3 would eliminate the need for a two pass heat transfer circuit. Instead, the intermediate liquor liquid would be accumulated and then continuously recirculated at the optimum heat transfer rate. Because the generator intermediate liquor liquid is continually flowing through the accumulator/distributor, the concentration of the intermediate liquor flowing through the heat transfer circuit would be maintained at the concentration of the intermediate liquor at the location of the accumulator/distributor in generator 12. Thus, the optimal GAX heat transfer can be controlled by controlling only the flow of intermediate liquor through the heat transfer circuit.

Figure 4:
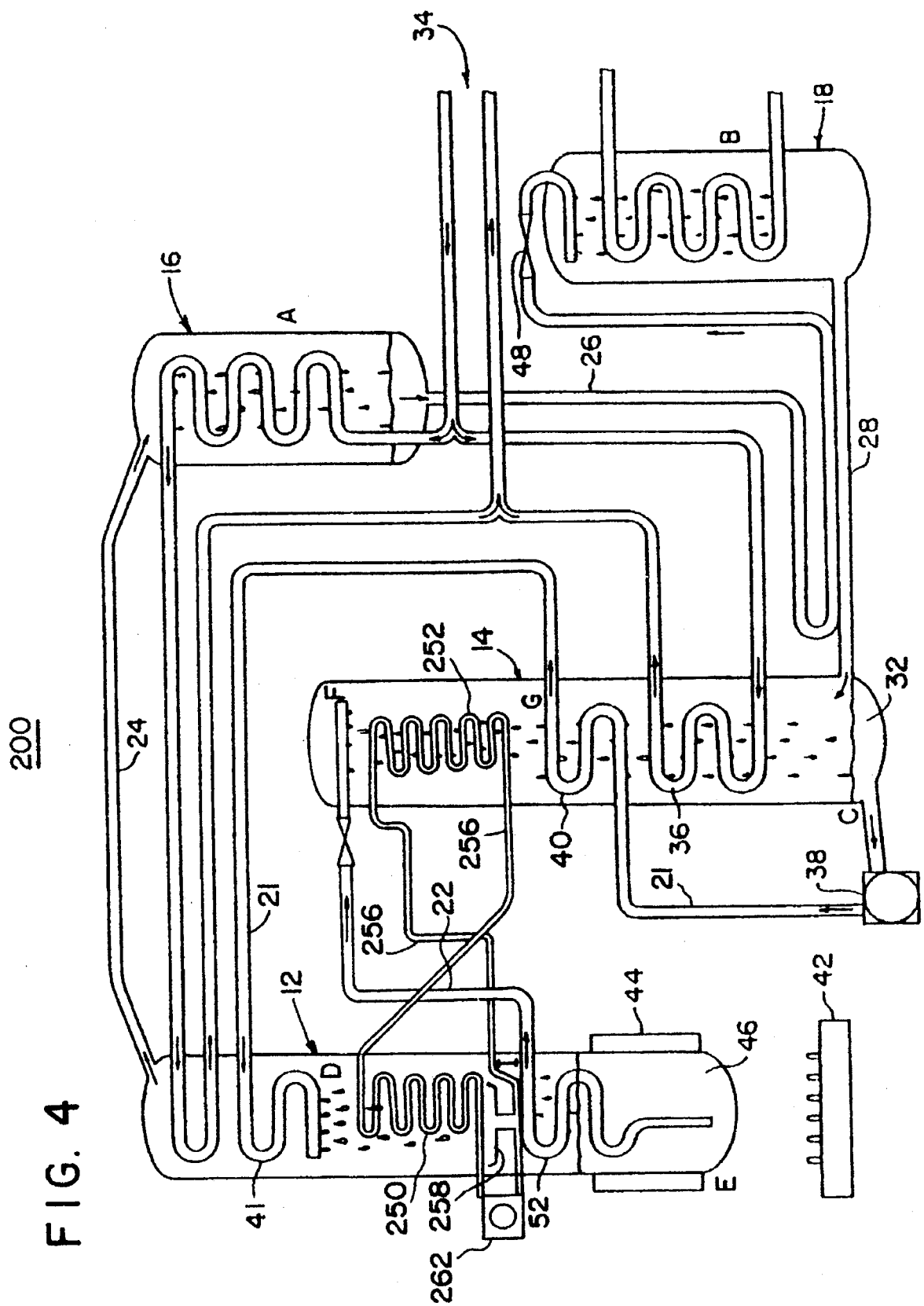
FIG. 4 is a flow diagram of a second embodiment of the GAX apparatus of the present invention.

Another embodiment of the invention, shown in FIG. 4, uses a substantially liquid phase working fluid taken from generator 12. Referring to FIG. 4, generator-absorber heat exchange apparatus 200 is illustrated, including liquid accumulator 258, which collects intermediate liquor from generator 12. Liquid accumulator 258 can be located anywhere in generator 12, preferably near or below region I. The intermediate liquor liquid collected by liquid accumulator 258 flows into and fills heat exchange conduit 256 by means of heat exchange circuit pump 262. Liquid accumulator 258 is in fluid communication with heat exchange conduit 256 to allow intermediate liquor liquid to flow into heat exchange conduit 256, and to allow vapor to flow out of heat exchange conduit 256 through the liquid, so that heat exchange conduit 256 can be filled with intermediate liquor liquid. When heat exchange conduit 256 is filled, intermediate liquor liquid flowing from generator 12 into liquid accumulator 258 overflows back into generator 12. Once heat exchange conduit 256 is filled with intermediate liquor liquid, liquid accumulator 258 no longer functions as an input end, but rather as an expansion chamber and concentration control chamber to maintain the intermediate liquor liquid in heat exchange conduit 256 at the concentration of the intermediate liquor at that location.

In accordance with the invention, the intermediate liquor is circulated between generator 12 and absorber 14 via heat exchange conduit 256 for heat transfer therebetween. In the embodiment illustrated in FIG. 4, unlike the embodiment illustrated by FIG. 3, heat exchange conduit 256 does not distribute the intermediate liquor into the generator 12 or absorber 14, but is instead an independent circuit that circulates the liquor serially and continuously between heat exchange coils 250 and 252 located in generator 12 and absorber 14, respectively. Heat exchange circuit pump 262 circulates the intermediate liquor through heat exchange conduit 256.

In accordance with the invention, heat exchange conduit 256 acts as an independent heat transfer circuit similar to circuit 30 in FIG. 1, but it does not require an extraneous fluid. Unlike circuit 30 in FIG. 1, heat exchange conduit 256 also does not need an expansion chamber because the intermediate liquor liquid in heat exchange conduit 256 is free to expand (or contract) into liquid accumulator 258. Furthermore, the composition and boiling temperature of the intermediate liquor liquid in heat exchange conduit 256 is automatically adjusted to the composition best suited for operation at varying outdoor conditions because the intermediate liquor liquid flowing to liquid accumulator 258 is adjusted to the weather conditions by the absorption unit controls. The intermediate liquor liquid flowing to liquid accumulator 258 in turn adjusts the liquid in heat exchange conduit 256 to that composition.

If the intermediate liquor liquid is ever boiled while being heated in heat exchange coil 252 in absorber 14, the vapor will flow to liquid accumulator 258 and escape into generator 12. This process thus serves to control the concentration and temperature of the intermediate liquor liquid in heat exchange conduit 256 to the proper levels, maintaining the heat transfer fluid as a sensible heat transfer liquid. The flow of intermediate liquor in heat exchange conduit 256 can also be controlled by a valve (not shown) located on the inlet or discharge of heat exchange circuit pump 262, or by controlling the RPM of heat exchange circuit pump 262.

Intermediate liquor flowing through heat exchange coil 252 is heated by the absorber from the temperature proximate to region G to the temperature proximate to region F. The intermediate liquor transfers that heat to the generator at similar temperatures from region I to region D. As discussed hereinafter, a range of intermediate liquors may be used for this purpose.

Figure 5:
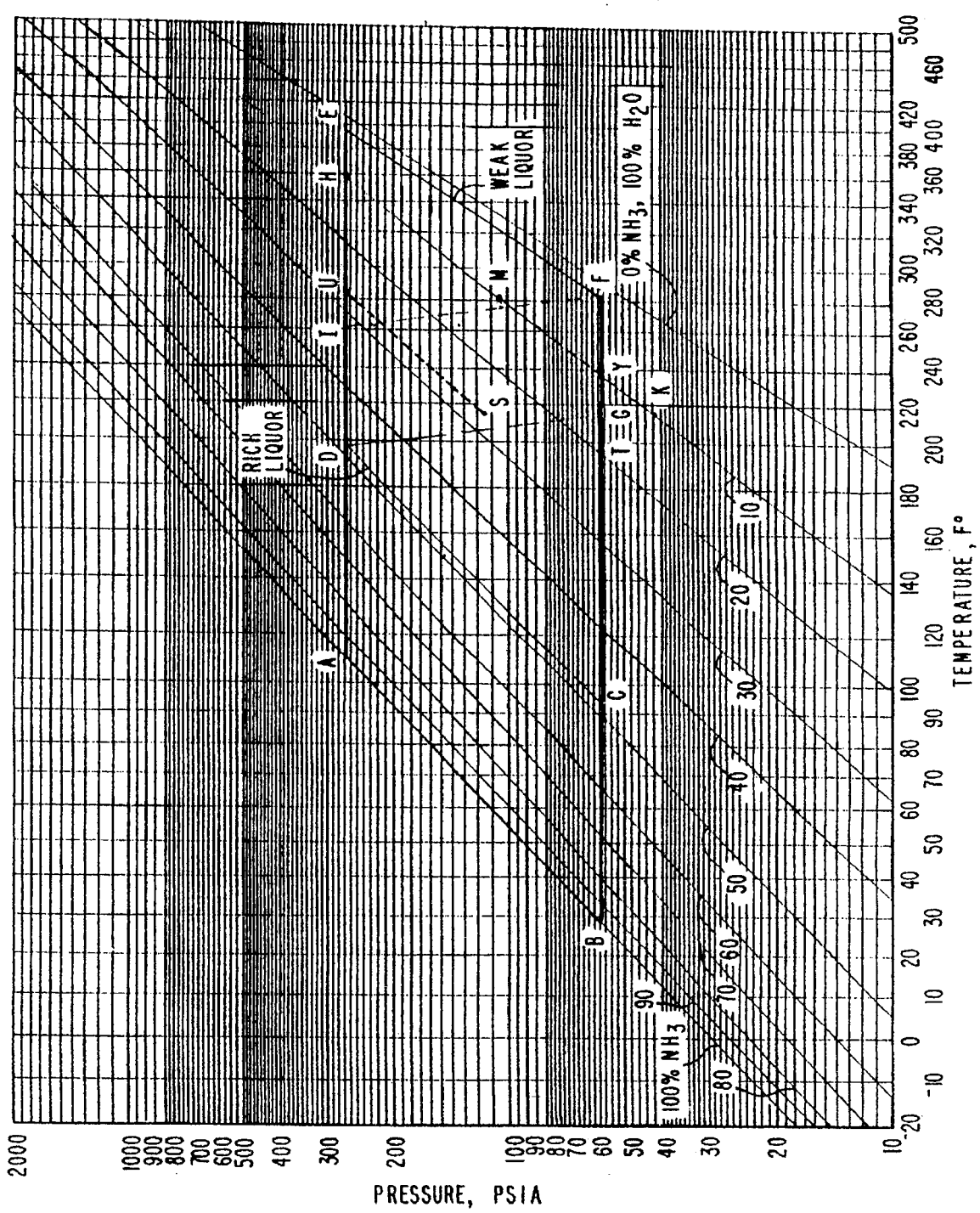
FIG. 5 is a pressure-temperature-composition (P-T-X) diagram related to FIGS. 3 and 4 of the present invention.

A preferred usage of the single phase, sensible heat intermediate liquors in accordance with the invention is shown in the pressure-temperature-composition diagram of FIG. 5. In the embodiments illustrated by FIGS. 3 and 4, the temperature overlap ranges of the absorber and generator are DU in the generator and TF in the absorber, T and D being at the same temperature and F and U being at the same temperature. However, allowing for temperature differentials for transferring heat from the absorber to the generator, the practical overlap ranges are DI in the generator and GF in the absorber.

Intermediate liquor liquids used for sensible heat transfer, such as shown in FIGS. 3 and 4, must be capable of being heated to temperature F without boiling. The intermediate liquors that will not boil at temperature F are those found in the generator at locations from U to E, as shown in FIG. 5. These intermediate liquors are at generator pressure, but over the range GF will have vapor pressures below the generator pressure. An example is the solution of slightly above 25% ammonia, shown in FIG. 5 as the line SU. The vapor pressure of this SU intermediate liquor will be at the generator pressure when extracted from generator 12 at point U. Point U is at a temperature F in absorber 14. This intermediate liquor solution can operate over the temperature range GF without rising above generator pressure if vapor pressures over the temperature range GF are those of line SU. This 25% solution has advantages over the 10% liquor solution shown in FIG. 5 as line KM in that the 25% solution has an endpoint U at generator pressure, and in that there is a greater quantity of this liquor flowing through the generator at point U than there is 10% solution at point N. In addition, its specific heat is higher. Therefore, the richer intermediate liquors, such as SU, can transfer the absorber overlap heat with fewer circuits through the heat exchange coils in the absorber and generator. Thus, in the embodiment shown in FIG. 3, the liquors extracted from generator 12 at or below region I to about point U in FIG. 5 would be preferable to the weaker intermediate liquors such as KM.

On the other hand, in the single phase sensible heat embodiment of FIG. 4, the richer intermediate liquors SU have no net advantage over the liquors KM. In the FIG. 4 system, intermediate liquor can be circulated through heat exchange conduit 256 by heat exchange circuit pump 262 at higher rates than in the embodiment of FIG. 3, to rates capable of transferring the total quantity of GAX heat in one pass. Intermediate liquors SU do have higher heat capacities, but the weaker intermediate liquors KM (in FIG. 5) are better suited for use over the full range of outdoor temperatures the heat pump must operate under, because their boiling temperature, point H in FIG. 5, is well above absorber temperature F and, thus, less control of intermediate liquor concentration is needed.

Figure 6:
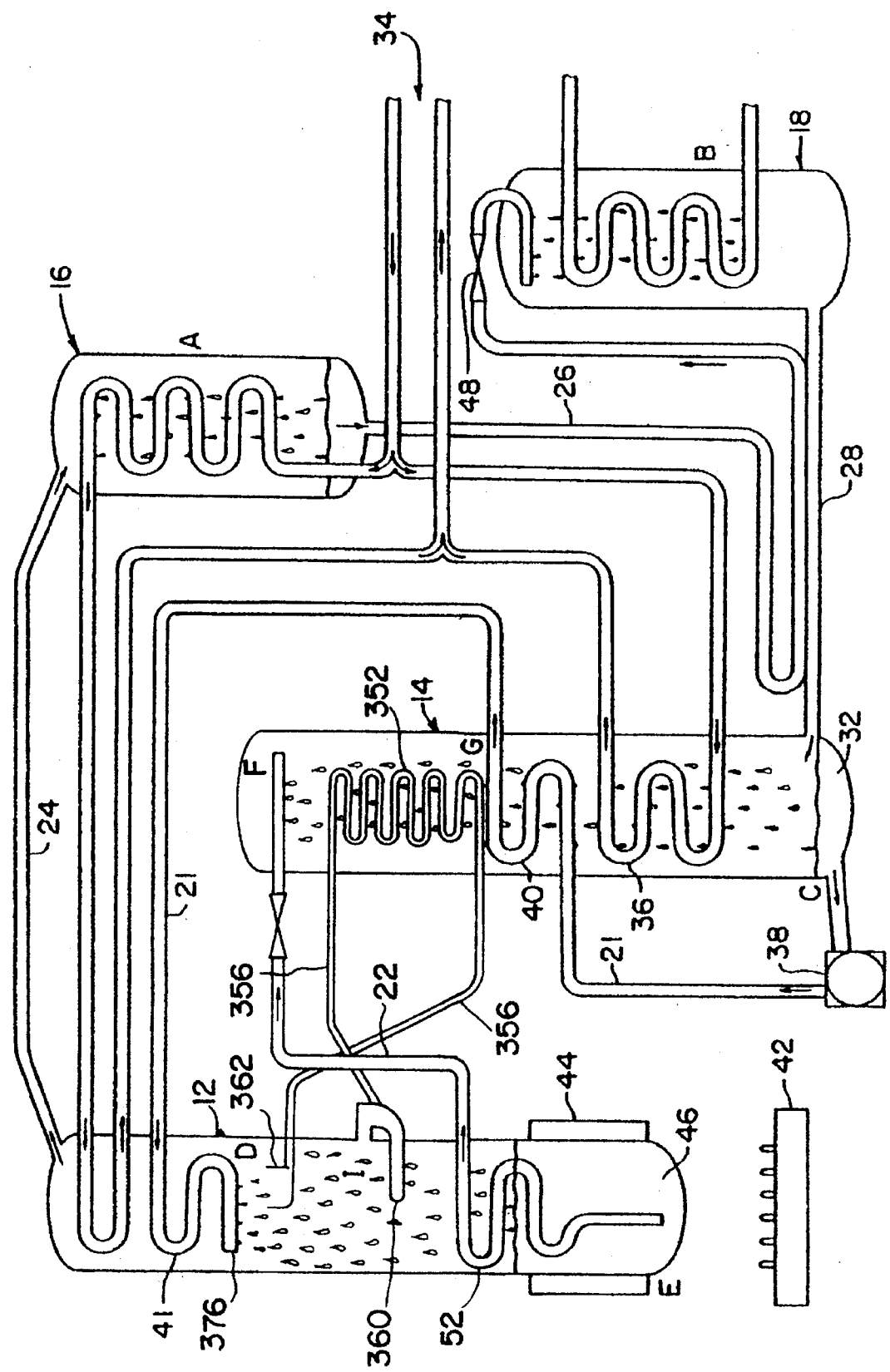
FIG. 6 is a flow diagram of a third embodiment of the GAX apparatus of the present invention.

Another embodiment of the invention, shown in FIG. 6, also uses a working fluid removed from generator 12 as the heat transfer fluid. This working fluid is a liquid/vapor two phase fluid in at least a portion of the heat exchange circuit, and thus exploits the latent heat of the working fluid. Referring specifically to FIG. 6, a generator-absorber heat exchange apparatus 300 is illustrated. In this embodiment, the heat exchange circuit comprises heat exchange coil 352 located in the heat transfer region of absorber 14. A heat exchange conduit 356 is provided which includes an input end disposed to withdraw intermediate liquor from a location preferably slightly below region D of generator 12 and an output end that can be, for example, a separator/distributor 360 preferably located proximate to region I of generator 12 for distributing the intermediate liquor. The input end in FIG. 6 is shown as liquid accumulator 362, and may be any means to collect intermediate liquor liquid in the interior of generator 12. Heat exchange conduit 356 conducts the intermediate liquor between heat transfer regions of generator 12 and absorber 14.

In accordance with this embodiment of the invention, the motive force for circulating intermediate liquor between generator 12 and absorber 14 may be gravity, in the form of the liquid head from the intermediate liquor collected by liquid accumulator 362. The intermediate liquor is circulated through heat exchange conduit 356 to heat exchange coil 352 where at least a portion of the intermediate liquor is vaporized by the heat of absorber 14. The two phase mixture of intermediate liquor is then circulated via heat exchange conduit 356 to separator/distributor 360 in generator 12. Separator/distributor 360 separates the two phase mixture and provides the liquid and vapor to generator 12, preferably at a location where the temperature and pressure in generator 12 is the same or similar to the temperature and pressure of intermediate liquor exiting separator/distributor 360. In this embodiment, separator/distributor 360 is preferably located proximate to region I of generator 12.

As mentioned, the intermediate liquor in this embodiment is a two phase mixture of vapor and liquid in at least a portion of heat exchange conduit 356. The rate of flow of intermediate liquor through heat exchange conduit 356 is controlled by the amount of liquid collected in liquid accumulator 362, the difference in height between liquid accumulator 362 and separator/distributor 360, the pressure drop through heat exchange conduit 356 and by the amount of vapor evaporated from the intermediate liquor liquid in heat exchange coil 352. The inlet section of heat exchange conduit 356 between liquid accumulator 362 and the bottom of heat exchange coil 352 is filled with intermediate liquor liquid. The liquor in heat exchange coil 352 is partly liquid and partly vapor, having a density well below that of the liquid in the inlet section of heat exchange conduit 356, thus increasing the head between the liquid accumulator 362 and separator/distributor 360. The extent to which the inlet liquid is vaporized in heat exchange coil 352 thus helps control the flow through heat exchange conduit 356. By properly adjusting the pressure drop in heat exchange conduit 356, the flow of intermediate liquor can be controlled by the amount of heat transfer in heat exchange coil 352. It is important that the portion of intermediate liquor collected by liquid accumulator 362 be greater than the largest amount of intermediate liquor to be used for heat transfer, i.e., there should be a small overflow from liquid accumulator 362.

Figure 7:
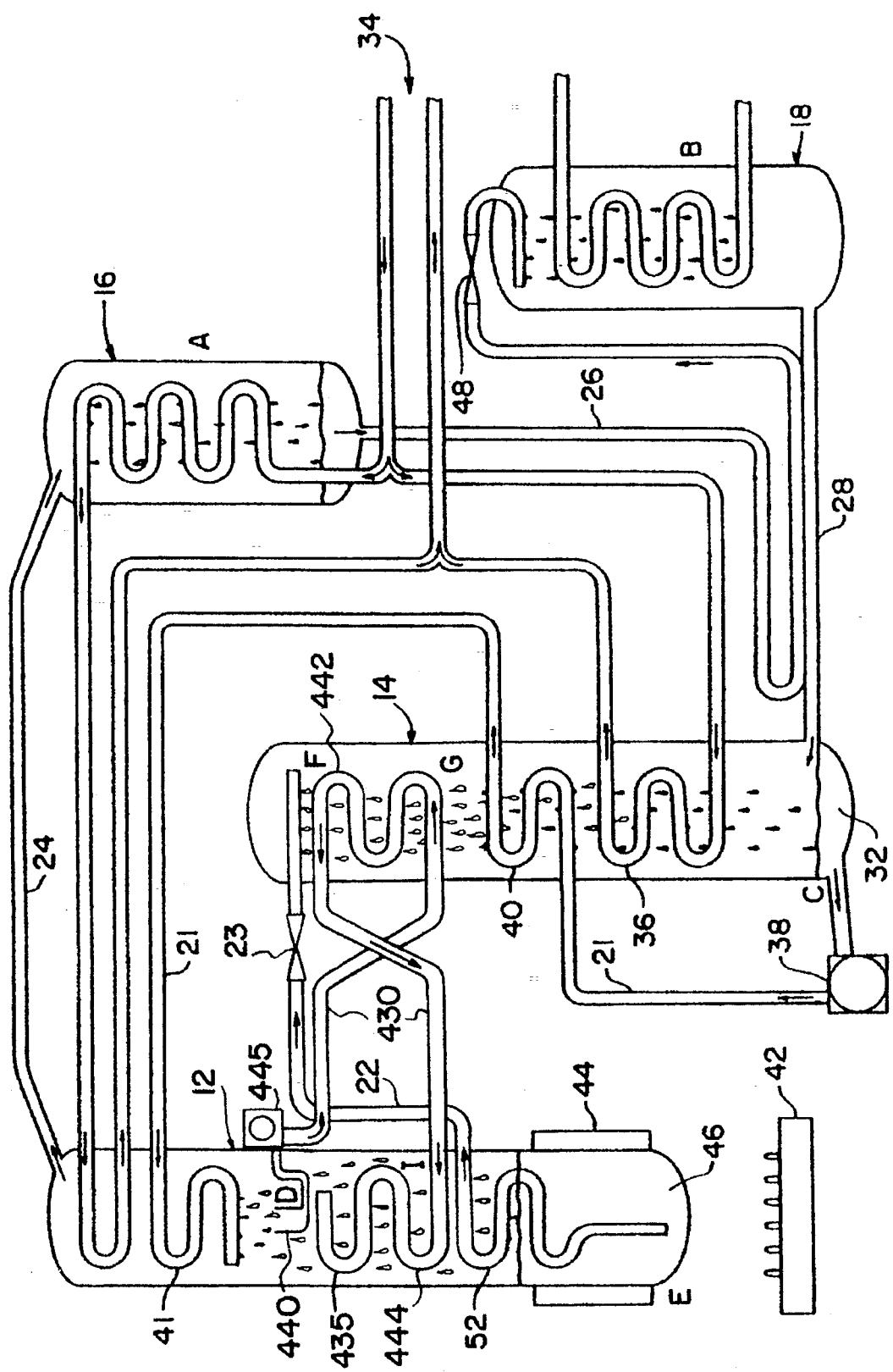
FIG. 7 is a flow diagram of a fourth embodiment of the GAX apparatus of the present invention.

Another embodiment of the invention, shown in FIG. 7, uses working fluid removed from generator 12 as the heat transfer fluid. This fluid is a liquid/vapor two phase mixture in at least a portion of the heat exchange circuit, and thus takes advantage of the latent heat of the working fluid. Referring specifically to FIG. 7, a generator-absorber heat exchange apparatus 400 is illustrated. In this embodiment, the heat exchange circuit comprises heat exchange coil 442 located in the heat transfer region of absorber 14 and heat exchange coil 444 located in the heat transfer region of generator 12. A heat exchange conduit 430 is provided which includes an input end disposed to withdraw intermediate liquor from generator 12 and an output end that is preferably a distributor 435 for distributing the intermediate liquor. The input end in FIG. 7 is shown as liquid accumulator 440, which is preferably located slightly below region D of generator 12, and may be any means to collect intermediate liquor liquid in the interior of generator 12.

In accordance with this embodiment of the invention, the motive force for circulating intermediate liquor between generator 12 and absorber 14 may be the liquid head between liquid accumulator 440 and the inlet of heat exchange coil 442, as in the embodiment of FIG. 6. Alternatively, if necessary, the motive force may be provided by heat exchange circuit pump 445, shown in FIG. 7. The intermediate liquor is circulated through heat exchange conduit 430 to heat exchange coil 442 in the heat transfer region of absorber 14 where at least a portion of the intermediate liquor is vaporized by the heat of absorber 14. The two phase mixture of intermediate liquor is then circulated via heat exchange conduit 430 to heat exchange coil 444 in the heat transfer region of generator 12 where it is cooled and the vapor is reabsorbed, giving up its heat to the interior of generator 12. The intermediate liquor exits heat exchange coil 444 at distributor 435. Distributor 435 is preferably located where the temperature and pressure in generator 12 is the same or similar to the temperature and pressure of intermediate liquor exiting distributor 435. In this embodiment, distributor 435 is preferably located just below accumulator 440 in generator 12.

As mentioned, the intermediate liquor in this embodiment is a two phase mixture of vapor and liquid in at least a portion of heat exchange conduit 430. The amount of flow of intermediate liquor between heat exchange coils 442 and 444 may be the total flow of intermediate liquor collected or may be controlled as described earlier herein, or by heat exchange circuit pump 445, to optimize the amount of heat transferred from absorber 14 to generator 12. As in the embodiment of FIG. 3, the liquid accumulator and distributor can be combined into a single accumulator/distributor, thereby allowing easy control of GAX heat transfer by controlling the flow rate of intermediate liquor through the heat exchange circuit.

Figure 8:
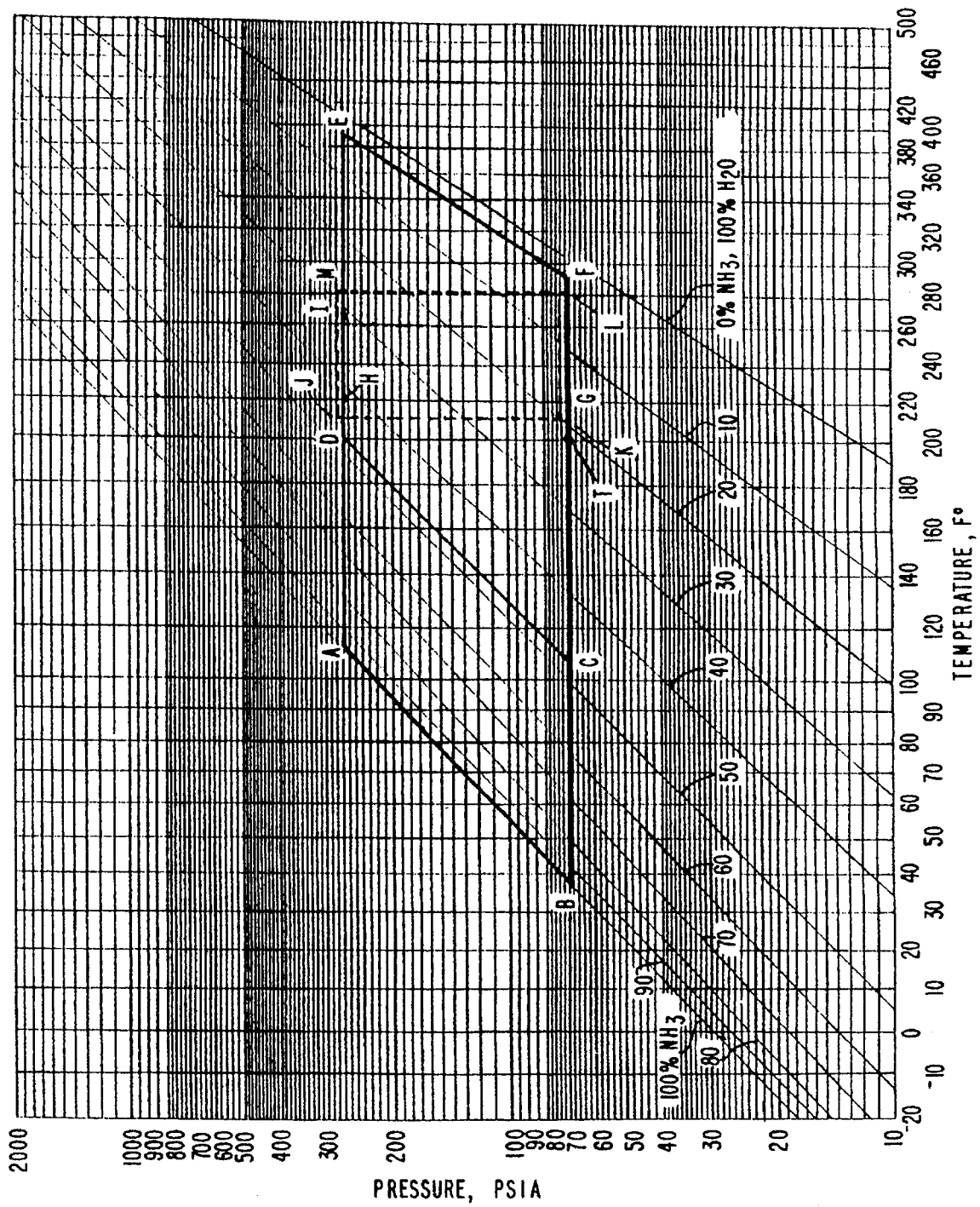
FIG. 8 is a pressure-temperature-composition (P-T-X) diagram related to FIGS. 6, 7 and 10 of the present invention.

Intermediate liquors for two phase heat transfer, such as the embodiments illustrated by FIGS. 6 and 7, are preferably taken from the richer end of the generator. For example, intermediate liquors between the points D and H on line AE in FIG. 8 are very advantageous for use in such systems, the temperature H being about equal to the temperature at region G of the absorber. Portions of such intermediate liquors can be boiled by heat from the absorber over the full range from G to F. The quantity of the intermediate liquor to be circulated is selected so the absorber heat is transferred in one pass in the embodiments illustrated in FIGS. 6 and 7.

For example, the manner in which the portion of the relatively rich intermediate liquor serves to transfer absorber heat in the embodiments of FIGS. 6 and 7 is shown in the ammonia/water PTX diagram of FIG. 8. The heat to be transferred is produced by absorption between the points G and F of absorber line CF in FIG. 8. The physical path of the portion of relatively rich intermediate liquor is represented by the dotted lines. The intermediate liquor is collected from a point J on the generator line DE. Throughout the circuit, the intermediate liquor remains at essentially generator pressure; the dotted line does not indicate pressure, only the heat exchange relationship and path.

Referring back to FIG. 6, the intermediate liquor liquid from generator 12 flows from liquid accumulator 362 through heat exchange conduit 356 to the bottom of heat exchange coil 352 at point K (FIG. 8) in absorber 14 where heat from absorber section GF is transferred to the intermediate liquor at dotted line KL, partly vaporizing the liquor. The temperature differences from G to K and from F to L represent the temperature differences required for the heat transfer. During the heat transfer, the two phase liquor flows from point K to point L. The intermediate liquor at L in FIG. 8 is at the top of heat exchange coil 352 of FIG. 6. This liquor then flows through heat exchange conduit 356 to separator/distributor 360 at or near region I, located at a temperature equivalent to point M in FIG. 8. In the embodiment of FIG. 6, the vapor and liquid are discharged into generator 12 preferably at or near region I. The vapor flows upward in counterflow to the remainder (the larger portion) of the intermediate liquor liquid that flows downwards through the generator. The two liquids, at about the same temperature and composition, join at separator/distributor 360 at or near region I in FIG. 6 to flow downward over heat exchange coil 52.

Referring to the embodiment of FIG. 7, the flow of the two phase liquor as represented in FIG. 8 is the same as in FIG. 6 up to point M, but then continues from point M to a location proximate point J where it reenters the generator as a liquid. In FIG. 7, the liquor at the temperature of point M in FIG. 8 enters heat exchange coil 444 of generator 12 at region I and flows upward through the coil, transferring heat in the liquor to generator 12 by reabsorption of the vapor. The intermediate liquor liquid resulting from complete reabsorption then flows into generator 12 through distributor 435, represented by point J in FIG. 8.

The intermediate liquors described above and illustrated in FIGS. 3, 4, 6 and 7 are extracted from the generator at the locations mentioned and operate essentially at generator pressure, except for the pressure required to circulate the fluid.

Other intermediate liquors extracted from the generator, for example, those between the point H and point M of line DE in FIG. 8, can also be used for sensible heat transfer or for latent heat transfer, but to do so they should be operated at pressures other than generator pressure. For sensible heat transfer with these "mid-range" intermediates, the pressure should be raised above generator pressure, to a pressure at which the liquors will not boil at temperature F. For latent heat transfer with such mid-range intermediate liquors, the pressure should be lowered by use of, for example, a restriction means, to a pressure at which the liquor will boil at absorber temperature G. After they have transferred the GAX heat, these liquors should then be pressurized to generator pressure and then returned to the generator. Similarly, the mid-range liquors used for sensible heat transfer should be depressurized to generator pressure after the GAX heat has been transferred.

In accordance with the invention, intermediate liquors taken from the absorber may also be used as the heat transfer fluid, for sensible heat transfer or, most preferably, for two phase heat transfer. Embodiments using intermediate liquors extracted from the absorber are shown in FIGS. 9–12.

The embodiment of the invention shown in FIG. 9 uses a working fluid taken from absorber 14 as the heat transfer fluid. This intermediate liquor has a relatively low ammonia concentration, and remains a liquid throughout the circuit, thus relying on sensible heat transfer. Referring specifically to FIG. 9, a generator-absorber heat exchange apparatus 450 is illustrated. In this embodiment the heat exchange circuit comprises a heat exchange coil 470 disposed in the heat transfer region of generator 12, a heat exchange coil 472 disposed in the heat transfer region of absorber 14 and a heat exchange conduit 476. Heat exchange conduit 476 has an input end that is a liquid accumulator 462 disposed to collect intermediate liquor from a location just below region F of absorber 14 and an output end that is a distributor 464 disposed to distribute intermediate liquor liquid in absorber 14. The intermediate liquor in this embodiment has a concentration close to that of weak liquor entering the absorber at high temperature region F. Heat exchange conduit 476 circulates the intermediate liquor between absorber 14 and generator 12.

In accordance with this embodiment of the invention, the flow of intermediate liquor from liquid accumulator 462 in absorber 14 to generator 12 occurs as a result of heat exchange circuit pump 466. From heat exchange circuit pump 466 the intermediate liquor is circulated to heat exchange coil 470 in generator 12, where it transfers heat to the interior of generator 12. The intermediate liquor is then circulated via heat exchange conduit 476 to heat exchange coil 472 in absorber 14. While only one circuit and one heat exchange coil in each of generator 12 and absorber 14 are shown in FIG. 9, multiple circuits and multiple heat exchange coils may be needed to transfer the total available GAX heat from absorber 14 to generator 12. After the total available GAX heat is transferred to generator 12, the intermediate liquor is reheated in the final absorber heat exchange coil to near the temperature at which it was collected and is distributed by distributor 464 into absorber 14, preferably located just below liquid accumulator 462. As in the embodiments of FIGS. 3 and 7, the liquid accumulator and distributor can be combined into a single accumulator/distributor, thereby allowing easy control of GAX heat transfer by controlling the flow rate of intermediate liquor through the heat exchange circuit, and enabling the use of only one heat exchange circuit.

The embodiment of the invention shown in FIG. 10 also uses a working fluid taken from absorber 14 as the heat transfer fluid. Unlike the embodiment of FIG. 9, however, the intermediate liquor in FIG. 10, which has a "medium" ammonia concentration, becomes a liquid/vapor two phase fluid in at least a portion of the heat exchange circuit, and thus takes advantage of the latent heat of the working fluid. Referring specifically to FIG. 10, a generator-absorber heat exchange apparatus 500 is illustrated. In this embodiment the heat exchange circuit comprises a heat exchange coil 502 disposed in the heat transfer region of absorber 14, a heat exchange coil 503 disposed in the heat transfer region of generator 12 and a heat exchange conduit 504. Heat exchange conduit 504 has an input end that is a liquid accumulator 506 disposed to collect intermediate liquor from a location at or near region G of absorber 14 and an output end that is a distributor 510 disposed to distribute intermediate liquor liquid in absorber 14. Heat exchange conduit 504 circulates intermediate liquor between absorber 14 and generator 12.

In accordance with this embodiment of the invention, the flow of intermediate liquor from liquid accumulator 506 in absorber 14 to generator 12 occurs as a result of heat exchange circuit pump 508. From heat exchange circuit pump 508 the intermediate liquor is circulated to heat exchange coil 502 in absorber 14, where at least a portion of the intermediate liquor is vaporized by the heat of absorber 14. The two phase mixture of intermediate liquor is then circulated via heat exchange conduit 504 to heat exchange coil 503 in generator 12, where it is cooled and the vapor is reabsorbed, giving up its heat to the interior of the generator. The intermediate liquor liquid is then returned via heat exchange conduit 504 to distributor 510 located at or near region G of absorber 14 just below liquid accumulator 506. As in the embodiments of FIGS. 3, 7 and 9, the liquid accumulator and distributor can be combined into a single accumulator/distributor, thereby allowing easy control of GAX heat transfer by controlling the flow rate of intermediate liquor through the heat exchange circuit.

Advantages of the embodiment of FIG. 10 include that the heat transfer circuit operates at the absorber pressure, that very low power is required to circulate the intermediate liquor, and only one pass around the heat exchange circuit is required. The latter two of these advantages are relative to other methods using pumps to circulate either liquids for sensible heat transfer, or rich liquors (or intermediate liquors close to rich liquor concentration) for latent heat transfer.

The intermediate liquors from about points T to G of FIG. 8 may advantageously be used in the embodiment of FIG. 10. In the embodiment of FIG. 10, the mid-concentration intermediate liquor taken from absorber 12 at locations from point T to point G contains approximately 20% ammonia, which when evaporated may be about 4% ammonia at point L. Thus, the concentrations of water in the vapor formed in equilibrium with these liquors are much higher than in the vapors from the 48% to 40% liquors around point J in FIG. 8, which are extracted from generator 12 for latent heat transfer in FIGS. 6 and 7. With higher water content, the enthalpies of the two-phase latent heat transfer intermediate liquors extracted from absorber 14 in FIG. 10 are therefore much greater than the enthalpies of two-phase liquors extracted from generator 12 in FIGS. 6 and 7. Accordingly, fewer pounds of intermediate liquor need to be circulated.

Figure 11:
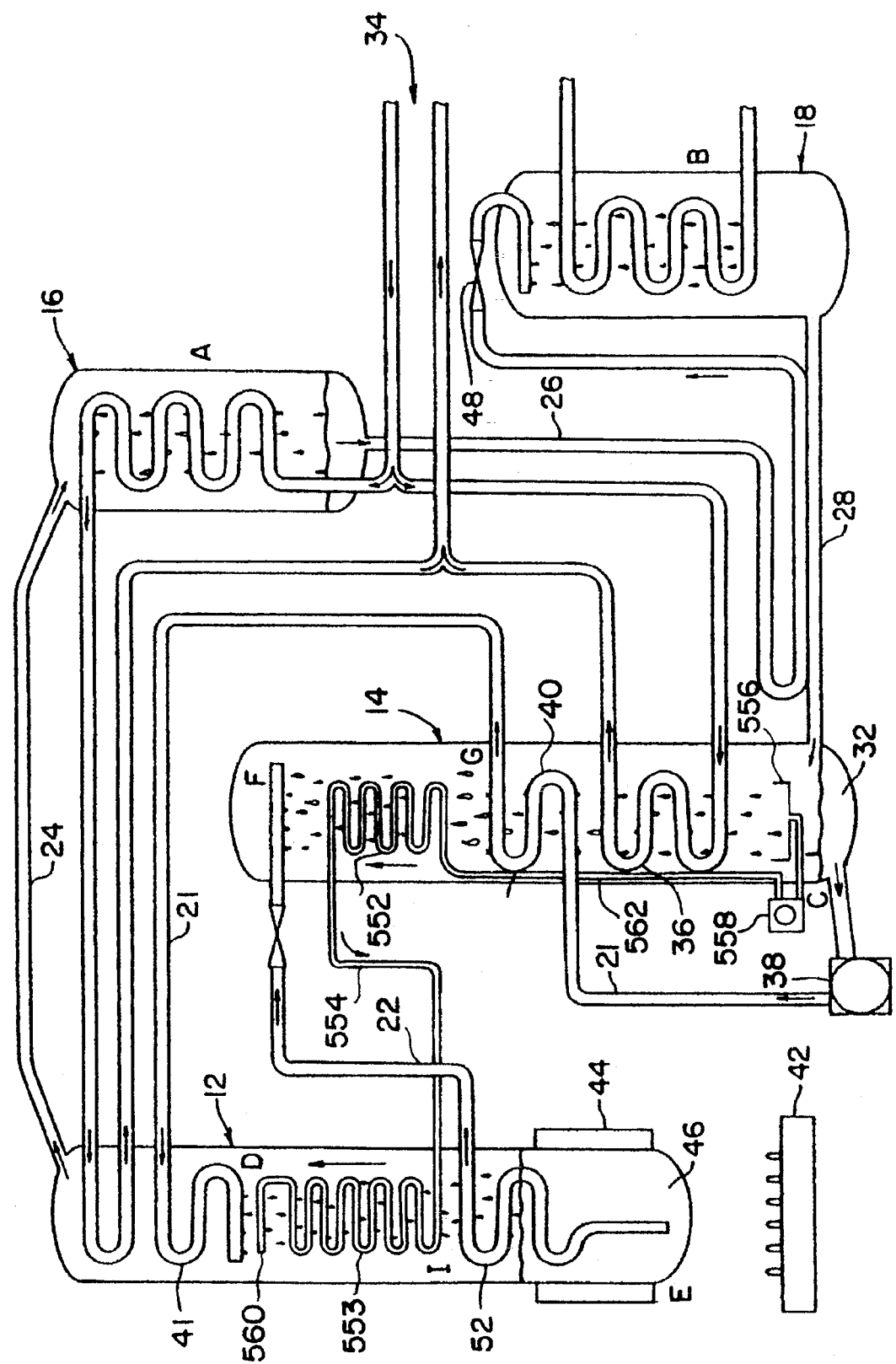
FIG. 11 is a flow diagram of a seventh embodiment of the GAX apparatus of the present invention.

The embodiment of the invention shown in FIG. 11 also uses a working fluid taken from absorber 14 as the heat transfer fluid. This fluid is, like the working fluid of FIG. 10, a liquid/vapor two phase fluid in at least a portion of the heat exchange circuit, and thus takes advantage of the latent heat of the working fluid. However, unlike the embodiment of FIG. 10, the embodiment shown in FIG. 11 collects the intermediate liquor at a location in absorber 14 very close to the absorber bottom, thus using an intermediate liquor that is very close to the composition of rich liquor.

Referring specifically to FIG. 11 a generator-absorber heat exchange apparatus 550 is illustrated. In this embodiment, the heat exchange circuit comprises a heat exchange coil 552 disposed in the heat transfer region of absorber 14, a heat exchange coil 553 disposed in the heat transfer region of generator 12 and a heat exchange conduit 554. Heat exchange conduit 554 has an input end that is a liquid accumulator 556 disposed to collect intermediate liquor from a location just above region C of absorber 14 and an output end that is a distributor 560 disposed to distribute intermediate liquor liquid in generator 12. Heat exchange conduit 554 circulates intermediate liquor between absorber 14 and generator 12.

In accordance with this embodiment of the invention, the flow of intermediate liquor from liquid accumulator 556 in absorber 14 to generator 12 occurs as a result of heat exchange circuit pump 558. From heat exchange circuit pump 558 the intermediate liquor is circulated to heat exchange coil 552 in absorber 14 via circuit pump discharge conduit 562. Circuit pump discharge conduit 562 is preferably located in the interior of absorber 14 so that the intermediate liquor flowing through circuit pump discharge conduit 562 is heated by the interior of absorber 14. At least a portion of the intermediate liquor is vaporized in heat exchange coil 552 by the heat of absorber 14. The two phase mixture of intermediate liquor is then circulated via heat exchange conduit 554 to heat exchange coil 553 in generator 12, where it is cooled and the vapor is reabsorbed, giving up its heat to the interior of the generator. The intermediate liquor liquid is then distributed into generator 12 by distributor 560 located just below region D of generator 12.

In accordance with the invention, an alternative to the embodiment illustrated in FIG. 11 is to immediately distribute the intermediate liquor as it enters generator 12. In this embodiment, a separator/distributor would be used to distribute the two phase mixture of liquid and vapor and heat exchange coil 553 would not be needed. The separator/distributor would preferably be located at a position where the temperature and pressure in generator 12 are the same or similar to the temperature and pressure of intermediate liquor exiting the separator/distributor, such as, for example, at or near region I.

In accordance with grandparent application Ser. No. 07/793,644, now U.S. Pat. No. 5,271,235, which is specifically incorporated herein by reference, increasing the flow rate of absorbent/refrigerant solution in the heat transfer region of the absorber will result in increased absorption in the heat transfer region of the absorber, resulting in increased heat transfer from the absorber to the generator. The heat transfer means of the present invention in combination with the flow enhancing means of U.S. Pat. No. 5,271,235 provides both an enhanced flow rate of intermediate liquor in the absorber heat transfer region and an existing means for collecting and pressurizing the absorber intermediate liquor and conducting it through the heat exchange circuit.

Figure 12:
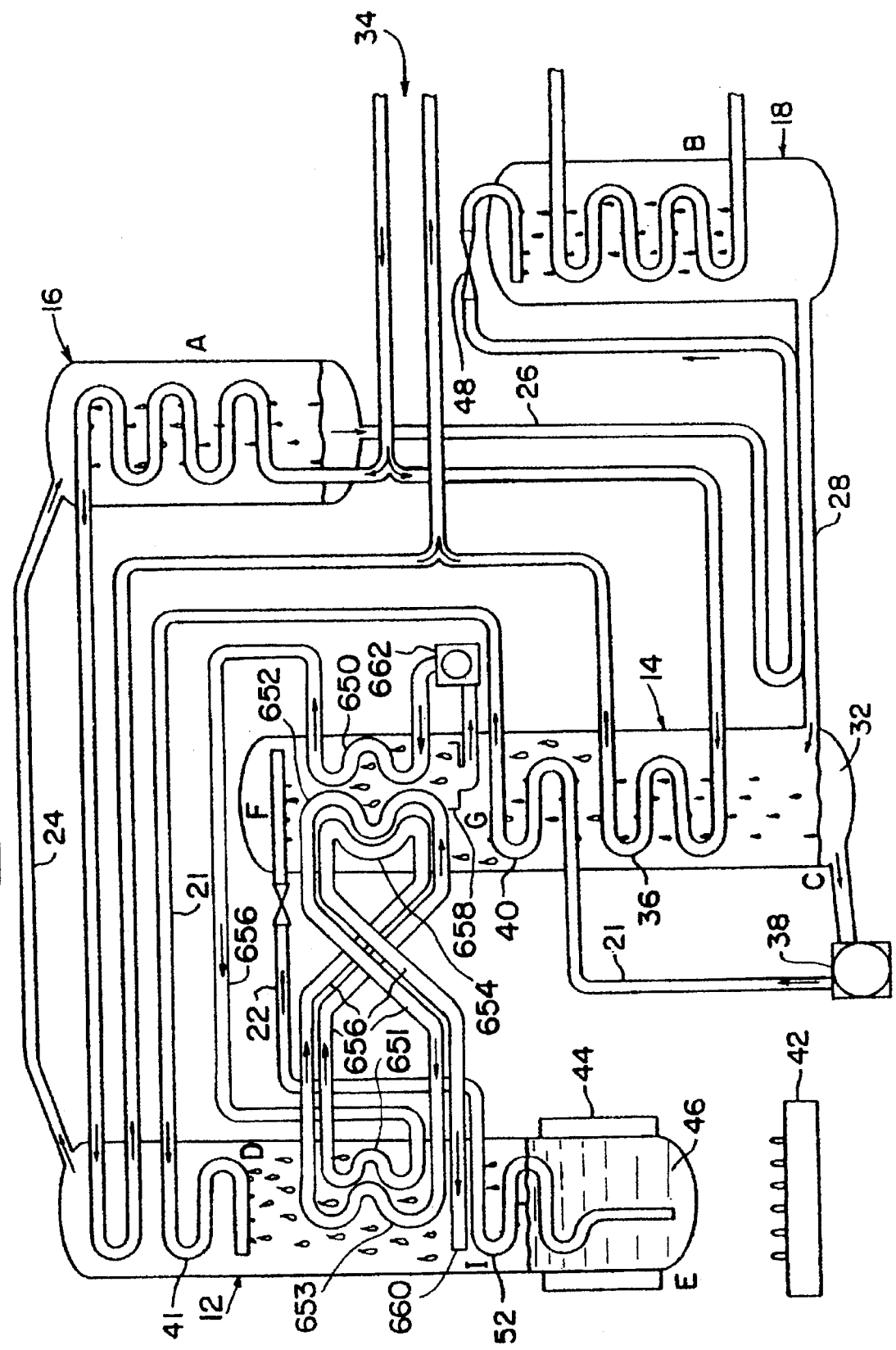
FIG. 12 is a flow diagram of an eighth embodiment of the GAX apparatus of the present invention.

An embodiment of the invention that increases the flow rate of absorbent/refrigerant solution in the heat transfer region of the absorber, resulting in increased absorption and absorber heat output in the heat transfer range and an intermediate liquor heat transfer means, is illustrated in FIG. 12. This embodiment uses a liquid phase working fluid taken from the absorber as the heat transfer medium, thus using the sensible heat of the working fluid. Referring specifically to FIG. 12, a generator-absorber heat exchange apparatus 600 is illustrated. In the embodiment illustrated, the heat exchange circuit comprises three heat exchange coils 650, 652 and 654 disposed in the heat transfer region of absorber 14, two heat exchange coils 651 and 653 disposed in the heat transfer region of generator 12 and a heat exchange conduit 656. Heat exchange conduit 656 has an input end that is a liquid accumulator 658 disposed to collect intermediate liquor from a location at or near region G of absorber 14 and an output end that is a distributor 660 disposed to distribute intermediate liquor liquid at or near region I of generator 12. Heat exchange conduit 656 circulates intermediate liquor between absorber 14 and generator 12.

In accordance with this embodiment of the invention, the motive force for the flow of intermediate liquor from liquid accumulator 658 in absorber 14 to generator 12 is provided by heat exchange circuit pump 662, which also provides the enhanced flow in accordance with the invention of U.S. Pat. No. 5,271,235. From heat exchange circuit pump 662 the intermediate liquor is circulated to heat exchange coil 650 in absorber 14, where heat is transferred from the interior of absorber 14 to the intermediate liquor. The intermediate liquor is then circulated via heat exchange conduit 656 to heat exchange coil 651 in generator 12, where sensible heat is transferred from the intermediate liquor to the interior of generator 12. The intermediate liquor liquid is then returned via heat exchange conduit 656 to heat exchange coil 652 in absorber 14 where heat is again transferred from the interior of absorber 14 to the intermediate liquor. The intermediate liquor than makes a second pass via heat exchange conduit 656 between generator 12 and absorber 14 through heat exchange coil 653 in generator 12 and heat exchange coil 654 in absorber 14. The intermediate liquor is finally circulated back to generator 12, where it is distributed at or near region I of via distributor 660.

In accordance with the invention, it may be necessary in the embodiment of FIG. 12 to add additional passes between absorber 14 and generator 12 to transfer the desired amount of heat from absorber 14 to generator 12. This is because the intermediate liquor collected and pumped from absorber 14 to generator 12 for flow enhancement may be a relatively small amount of liquid.

In all of the embodiments of the invention described herein and variations thereof, it is preferable to orient the flow of heat transfer liquid, or liquid and vapor mixture, vertically upwards when passing such through a heat exchange coil in either the generator or absorber. This flow orientation generally best matches the temperature gradients in the absorber and generator and provides the best counterflow temperature differentials between the rising coil contents and falling liquids in the absorber or generator.

In accordance with the embodiments of the GAX heat transfer apparatus described herein, the heat exchange coils can be located in the interior of the generator and absorber. Alternatively, in accordance with the invention, the heat exchange coils can be located at the exterior of the generator and absorber adjacent to and/or in heat transfer contact with the region in which heat transfer is desired. The term "heat transfer region" as used herein is meant to include the interior of the generator or absorber, as well as regions outside the generator or absorber adjacent to and/or in heat transfer contact with the region in which heat transfer is desired.

Figure 13:
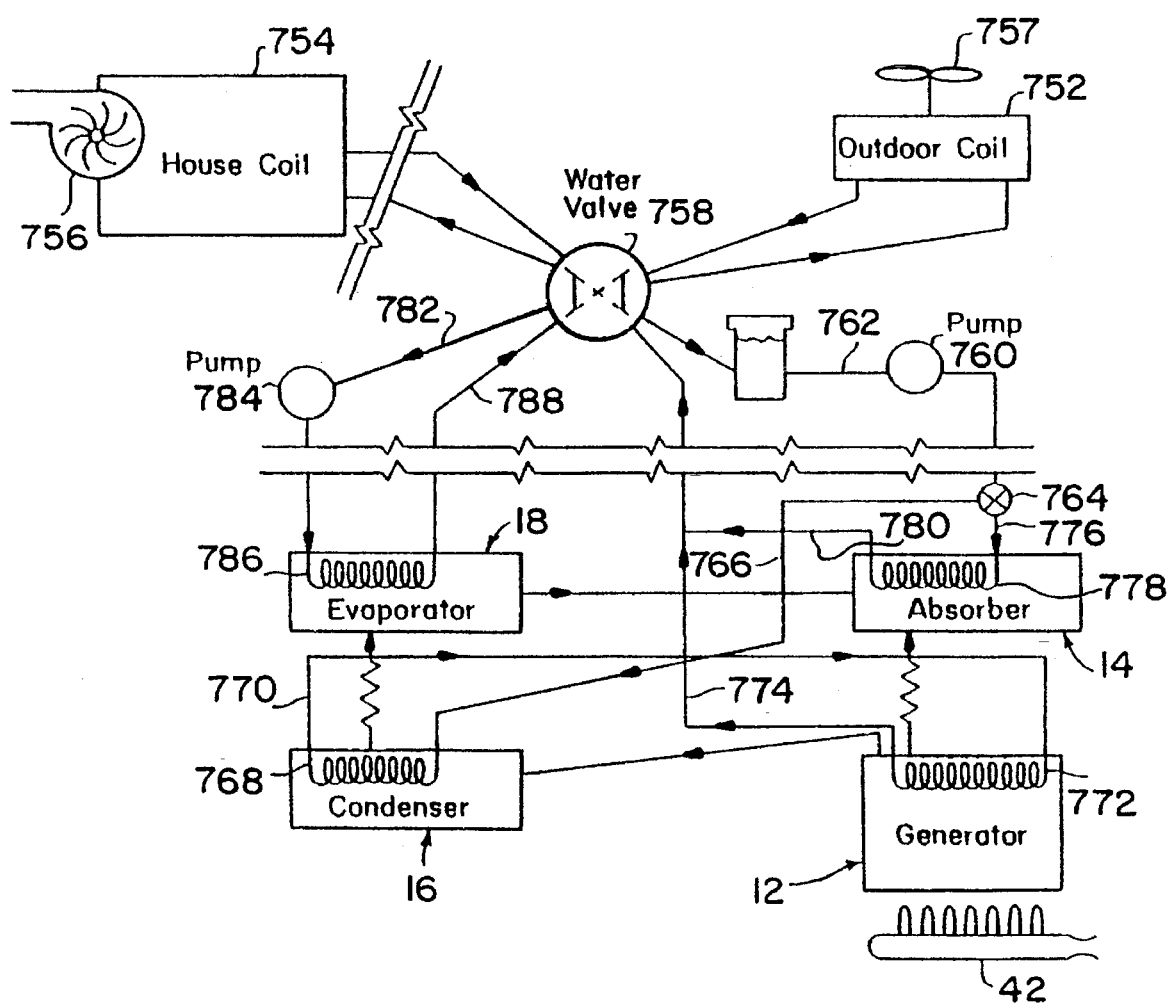
FIG. 13 is a flow diagram of the heat pump of the present invention using the generator-absorber heat exchange apparatus of the invention.

The various embodiments of the generator-absorber heat exchange apparatus of the invention can advantageously be used in a heat pump. Referring to FIG. 13, a heat pump 700 is provided which uses one of the generator-absorber heat exchange apparatuses of the invention. The heat pump 700 includes an outdoor heat exchange coil 752 and an indoor heat exchange coil 754. Indoor heat exchange coil 754 may optionally include an air transport apparatus 756, such as a fan or blower for supplying heated or cooled air into a building. Outdoor heat exchange coil 752 may also optionally include an air transport apparatus 757, such as a fan or blower. Outdoor and indoor heat exchange coils 752 and 754, and air transport apparatuses 756 and 757, can be any of the standard, known equipment used in heat pump or air conditioning systems.

Heat pump 700 is comprised of two major sections, the generator-absorber heat exchange apparatus (absorption unit) and the antifreeze fluid system. The generator absorber heat exchange apparatus in accordance with the invention can be made up of the components discussed earlier herein, including an absorber 14, generator 12, condenser 16 and evaporator 18. The antifreeze fluid system is divided into a cold fluid circuit and a hot fluid circuit. The antifreeze fluids that can be used in accordance with the invention include those fluids known to be useful in transferring heat. A preferred antifreeze fluid is a water solution including an antifreeze liquid that is nontoxic and nonflammable, such as, for example, propylene glycol.

Contrary to standard heat pump systems that reverse the refrigeration circuit to change from cooling to heating, heat pump 700 of the invention, rather than reversing the refrigeration circuit, uses a system flow control apparatus 758, which is preferably an eight-way valve, that is capable of reversing the antifreeze circuits. System flow control apparatus 758 makes it possible to direct the cold and the hot antifreeze fluids from the cold evaporator 18 or from the hot condenser 16, absorber 14 and rectifier of generator 12 either to the outdoor heat exchange coil 752 or to the indoor heat exchange coil 754.

The cold antifreeze circuit comprises evaporator 18, which chills the antifreeze fluid via evaporator heat exchange coil 786, extracting from the antifreeze fluid the heat removed from the house or building in the summer or from the outdoor air in winter.

The hot antifreeze circuit comprises absorber 14, condenser 16 and rectifier of generator 12, which raise the temperature of the extracted heat to well above 100° F. The sum of the heat outputs of absorber 14, condenser 16 and rectifier of generator 12 is equal to the sum of the two heat input quantities, one from the gas flame and the other being the low temperature heat input to evaporator 18. Absorber 14, rectifier of generator 12 and condenser 16 transfer the system output heat to the hot antifreeze fluid via absorber heat exchange coil 778, rectifier heat exchange coil 772 and condenser heat exchange coil 768. In the winter, the hot antifreeze fluid transfers much more heat to the house or building than that from the gas flame. In many areas, supplemental heat may not be required.

In one specific embodiment of the heat pump of the invention, illustrated in FIG. 13, the hot antifreeze circuit includes a first conduit 762 which transports the antifreeze fluid from system flow control apparatus 758 to a first flow control device 764, which can be, for instance, a flow splitter. A fluid transport apparatus 760, such as a pump, is used to circulate the antifreeze fluid through the hot antifreeze circuit. Fluid transport apparatus 760 can be located anywhere in the hot antifreeze circuit, but is preferably located in first conduit 762.

In accordance with this embodiment, a first portion of the antifreeze fluid from first conduit 762 is directed via first flow control device 764 to a second conduit 766, which transports the antifreeze fluid to condenser heat exchange coil 768. In condenser heat exchange coil 768, heat is transferred from condenser 16 to the antifreeze fluid. The antifreeze fluid is transported from condenser heat exchange coil 768 to rectifier heat exchange coil 772 via third conduit 770. In rectifier heat exchange coil 772, heat is transferred from generator 12 to the antifreeze fluid. The antifreeze fluid is transported from rectifier heat exchange coil 772 back to system flow control apparatus 758 via fourth conduit 774.

A second portion of the antifreeze fluid in this embodiment from first conduit 762 is directed via first flow control device 764 to a fifth conduit 776, which transports the antifreeze fluid to absorber heat exchange coil 778. In absorber heat exchange coil 778, heat is transferred from absorber 14 to the antifreeze fluid. The antifreeze fluid is transported from absorber heat exchange coil 778 via sixth conduit 780 into fourth conduit 774 and back to system flow control apparatus 758.

The particular flow arrangement for the hot antifreeze circuit illustrated by FIG. 13 is meant to be illustrative only and should not limit the invention. Other flow arrangements for the antifreeze fluid between absorber 14, condenser 16 and generator 12 are within the scope of the invention. For example, the flow of antifreeze fluid through absorber 14, condenser 16 and generator 12 may be in parallel, as shown, or in series. However, it may be preferred that the flow through condenser 16 and absorber 14 be in parallel, as shown in FIG. 13.

The cold antifreeze circuit includes a first conduit 782 which circulates antifreeze fluid from system flow control apparatus 758 to evaporator heat exchange coil 786. In evaporator heat exchange coil 786, heat is transferred from the antifreeze fluid to evaporator 18. The antifreeze fluid is transported from evaporator heat exchange coil 786 back to system flow control apparatus 758 via second conduit 788. A fluid transport apparatus 784, such as a pump, is used to circulate the antifreeze fluid through the cold antifreeze circuit. Fluid transport apparatus 784 can be located elsewhere in the cold antifreeze circuit, but is preferably located in first conduit 782. The particular flow arrangement for the cold antifreeze circuit illustrated by FIG. 13 is meant to be illustrative only and should not limit the scope of the invention.

System flow control apparatus 758 directs the cold antifreeze to indoor heat exchange coil 754 in summer and to outdoor heat exchange coil 752 in winter, at the same time directing the hot antifreeze to outdoor heat exchange coil 752 in summer and to indoor heat exchange coil 754 in winter. This method of reversing the flows to meet the household or building needs for heating or cooling also can also be used during the winter to defrost outdoor heat exchange coil 752, when desired, by reversing the flow to direct hot antifreeze to outdoor heat exchange coil 752.

The choice of materials of construction for all the embodiments described herein and variations thereof depends upon the components of the working fluid, i.e., the refrigerant and absorbent, and the expected operating pressure and temperature ranges. For an ammonia and water absorption solution operating up to about 300° F. (thus excluding the lower region of the generator) and pressures up to about 300 psia, mild steel is the preferred choice of material for all components contacting the solution. Aluminum, however, may be used for the evaporator and condenser, which come into contact with ammonia. The choice of materials of construction for other solutions should be known to those skilled in the art of absorption systems.

While the various GAX heat transfer means described herein have been illustrated in a residential or light commercial heat pump, their benefits are not limited to such applications. The enhanced performance provided by the various GAX heat transfer schemes set forth herein may be applied to processes requiring medium temperature heating and cooling such as brewing, food processing, pasteurizing and paper making, to mention but a few examples. Furthermore, the principles of the invention are not limited to absorption heat pump cycles that efficiently convert heat from a combination of low and high temperature heat sources to heat at a medium temperature. The invention is equally applicable to heat transformers which convert heat from a medium-high temperature, such as hot waste water discharged from a processing plant, to produce a useful high temperature output plus a lower temperature output.

It will be apparent to those skilled in the art that various modifications and variations can be made in the generator-absorber heat exchange apparatus, heat pump and method of transferring heat between the generator and absorber without departing from the spirit or scope of the invention. Thus, it is intended that the present invention cover the modifications and variations of this invention provided that they come within the scope of the appended claims and their equivalents.

What is claimed is:

1. In a generator-absorber heat exchange apparatus including a generator and an absorber, the absorber having an interior pressure lower than the pressure of the generator interior and each having high and low temperature regions at opposite ends establishing respective temperature ranges, the temperature ranges defining respective overlapping heat transfer regions, and a fluid flow pathway circulating a liquor having rich, intermediate and weak concentrations of refrigerant to and through the high temperature, heat transfer and low temperature regions of the generator and the absorber, the improvement comprising:

a heat exchange circuit receiving a liquor from said fluid flow pathway at a location where the liquor has an intermediate liquor concentration and circulating said intermediate liquor between said heat transfer regions thereby transferring heat from the absorber to the generator.

2. The apparatus of claim 1 wherein the heat exchange circuit comprises at least one heat exchange element in the heat transfer region of the absorber, and a conduit conducting said intermediate liquor from the fluid flow pathway through said heat exchange element and between heat transfer regions.

3. The apparatus of claim 1 wherein the heat exchange circuit comprises a plurality of heat exchange elements, at least one being disposed in the heat transfer region of each of the generator and absorber, and a conduit conducting said intermediate liquor from the fluid flow pathway serially to each heat exchange element alternately between heat transfer regions.

4. The apparatus of claim 1 wherein the heat exchange circuit further comprises a heat exchange circuit pump for circulating said intermediate liquor.

5. The apparatus of claim 1 wherein gravity provides the motive force for circulating said intermediate the liquor.

6. The apparatus of claim 1 wherein the heat exchange circuit further comprises an input end in fluid communication with the fluid flow pathway.

7. The apparatus of claim 5 wherein the heat exchange circuit further comprises an output end for distributing said intermediate liquor within one of the generator and the absorber.

8. The apparatus of claim 1 wherein the intermediate liquor circulated between heat transfer regions of the generator and absorber is substantially in the liquid state.

9. The apparatus of claim 1 wherein the intermediate liquor circulated between heat transfer regions of the generator and absorber is a two phase mixture of liquid and vapor in at least a portion of the heat exchange circuit.

10. A generator-absorber heat exchange apparatus comprising:

a generator containing a liquor having a concentration gradient that is rich proximate an upper end, weak proximate a lower end and intermediate therebetween, and a temperature gradient extending from low proximate the upper end to high proximate the lower end with a heat transfer region therebetween;

an absorber having a pressure in its interior lower than the interior pressure of the generator and containing a liquor having a concentration gradient that is weak proximate an upper end, rich proximate a lower end and intermediate therebetween, and a temperature gradient extending from high proximate the upper end to low proximate the lower end with a heat transfer region therebetween;

a rich liquor conduit having an inlet in fluid communication with the absorber proximate the lower end thereof and an outlet disposed in the generator proximate the upper end thereof distributing rich liquor from the lower end of the absorber for passage along the concentration and temperature gradients of the generator;

a pump in fluid communication with the rich liquor conduit moving fluid through the conduit between the absorber and the generator;

a weak liquor conduit having an inlet in fluid communication with the generator proximate the lower end thereof and an outlet disposed in the absorber proximate the upper end thereof distributing weak liquor from the lower end of the generator for passage along the concentration and temperature gradients of the absorber;

a heater disposed to heat liquor in the generator proximate the lower end thereof; and a heat exchange circuit comprising:

at least one heat exchange element in the heat transfer region of the absorber, said heat transfer regions of the generator and absorber having overlapping temperatures;

a heat exchange conduit having an input end receiving liquor from at least one of the absorber and the generator at a location where the liquor has an intermediate concentration and conveying the intermediate liquor between the heat transfer regions of the absorber and the generator for heat transfer therein.

11. The apparatus of claim 10, wherein the heat exchange circuit further comprises an output end for distributing the intermediate liquor within one of the generator and the absorber.

12. The apparatus of claim 10 wherein the heat exchange circuit comprises a plurality of heat exchange elements, at least one being disposed in the heat transfer region of each of the generator and absorber.

13. The apparatus of claim 12, wherein the heat exchange circuit further comprises an output end for distributing the intermediate liquor within one of the generator and the absorber.

14. The apparatus of claim 10 wherein the input end is a liquid accumulator.

15. The apparatus of claim 11 wherein the output end is a distributor.

16. The apparatus of claim 11 wherein the input end and the output end is a combined accumulator/distributor.

17. The apparatus of claim 10 wherein the heat exchange circuit further comprises a heat exchange circuit pump for circulating said intermediate liquor.

18. The apparatus of claim 10 wherein the intermediate liquor circulated between heat transfer regions of the generator and absorber is substantially in the liquid state.

19. The apparatus of claim 10 wherein the intermediate liquor circulated between heat transfer regions of the generator and absorber is a two phase mixture of liquid and vapor in at least a portion of the heat exchange circuit.

20. The apparatus of claim 13 wherein said heat exchange circuit comprises:
- two heat exchange elements disposed in the heat transfer region of the absorber and two heat exchange elements disposed in the heat transfer region of the generator;
- a heat exchange conduit with said input end receiving intermediate liquor from the generator and said output end distributing said intermediate liquor in the generator, said heat exchange conduit serially interconnecting said heat exchange elements to conduct said intermediate liquor alternately between the generator and absorber heat transfer regions.

21. The apparatus of claim 20 wherein the intermediate liquor circulated between heat transfer regions of the generator and absorber is substantially in the liquid state.

22. The apparatus of claim 20 wherein the motive force for circulating the intermediate liquor is provided by a heat exchange circuit pump.

23. The apparatus of claim 20 wherein said input and output ends are located in substantially the same region of the generator.

24. The apparatus of claim 23 wherein said input end is a liquid accumulator and said output end is a distributor.

25. The apparatus of claim 23 wherein said input and output ends are a combined accumulator/distributor.

26. The apparatus of claim 12 wherein said heat exchange circuit comprises:
- a heat exchange element disposed in the heat transfer region of the generator and a heat exchange element disposed in the heat transfer region of the absorber;
- a heat exchange conduit with said input end receiving intermediate liquor from the generator, said heat exchange conduit serially interconnecting said heat exchange elements to conduct said intermediate liquor alternately between the generator and absorber heat transfer regions.

27. The apparatus of claim 26 wherein the intermediate liquor circulated between heat transfer regions of the generator and absorber is substantially in the liquid state.

28. The apparatus of claim 26 wherein the motive force for circulating the intermediate liquor is provided by a heat exchange circuit pump.

29. The apparatus of claim 26 wherein the input end is a liquid accumulator.

30. The apparatus of claim 11 wherein said heat exchange circuit comprises:
- a heat exchange element disposed in the heat transfer region of the absorber;
- a heat exchange conduit with said input end receiving intermediate liquor from the generator and said output end distributing said intermediate liquor to the generator, said heat exchange conduit conducting said intermediate liquor between the generator and absorber heat transfer regions.

31. The apparatus of claim 30 wherein the motive force for circulating said intermediate liquor is gravity.

32. The apparatus of claim 30 wherein the intermediate liquor circulated between heat transfer regions of the generator and absorber is a two phase mixture of liquid and vapor in at least a portion of the heat exchange circuit.

33. The apparatus of claim 30 wherein said input and output ends are located in different regions of the generator.

34. The apparatus of claim 33 wherein said input end is a liquid accumulator and said output end is a distributor.

35. The apparatus of claim 13 wherein said heat exchange circuit comprises:
- a heat exchange element disposed in the heat transfer region of the generator and a heat exchange element disposed in the heat transfer region of the absorber;
- a heat exchange conduit with said input end receiving intermediate liquor from the generator and said output end distributing said intermediate liquor to the generator, said heat exchange conduit serially interconnecting said heat exchange elements to conduct said intermediate liquor between the generator and absorber heat transfer regions.

36. The apparatus of claim 35 wherein the heat exchange circuit further comprises a heat exchange circuit pump for circulating said intermediate liquor.

37. The apparatus of claim 35 wherein the intermediate liquor circulated between heat transfer regions of the generator and absorber is a two phase mixture of liquid and vapor in at least a portion of the heat exchange circuit.

38. The apparatus of claim 35 wherein said input and output ends are located in substantially the same region of the generator.

39. The apparatus of claim 38 wherein said input end is a liquid accumulator and said output end is a distributor.

40. The apparatus of claim 38 wherein said input and output ends are a combined accumulator/distributor.

41. The apparatus of claim 13 wherein said heat exchange circuit comprises:
- at least one heat exchange element disposed in the heat transfer region of the generator and at least one heat exchange element disposed in the heat transfer region of the absorber;
- a heat exchange conduit with said input end receiving intermediate liquor from the absorber and said output end distributing said intermediate liquor to the absorber, said heat exchange conduit serially interconnecting said heat exchange elements to conduct said intermediate liquor between the generator and absorber heat transfer regions.

42. The apparatus of claim 41 wherein the heat exchange circuit further comprises a heat exchange circuit pump for circulating said intermediate liquor.

43. The apparatus of claim 41 wherein the intermediate liquor circulated between heat transfer regions of the generator and absorber is a two phase mixture of liquid and vapor in at least a portion of the heat exchange circuit.

44. The apparatus of claim 41 wherein the intermediate liquor circulated between heat transfer regions of the generator and absorber is substantially in the liquid state.

45. The apparatus of claim 41 wherein said input and output ends are located in substantially the same region of the absorber.

46. The apparatus of claim 45 wherein said input end is a liquid accumulator and said output end is a distributor.

47. The apparatus of claim 45 wherein said input and output ends are a combined accumulator/distributor.

48. The apparatus of claim 11 wherein said heat exchange circuit comprises:
- a heat exchange element disposed in the heat transfer region of the absorber;
- a heat exchange conduit with said input end receiving intermediate liquor from the absorber and said output end distributing said intermediate liquor to the generator, said heat exchange conduit conducting said intermediate liquor between the generator and absorber heat transfer regions.

49. The apparatus of claim 48, further comprising a heat exchange element disposed in the heat transfer region of the generator.

50. The apparatus of claim 49 wherein the heat exchange circuit further comprises a heat exchange circuit pump for circulating said intermediate liquor.

51. The apparatus of claim 49 wherein the intermediate liquor circulated between heat transfer regions of the generator and absorber is a two phase mixture of liquid and vapor in at least a portion of the heat exchange circuit.

52. The apparatus of claim 49 wherein said input end is a liquid accumulator and said output end is a distributor.

53. The apparatus of claim 13 wherein said heat exchange circuit comprises:

- at least two heat exchange elements disposed in the heat transfer region of the generator and at least three heat exchange elements disposed in the heat transfer region of the absorber;
- a heat exchange conduit with said input end receiving intermediate liquor from the absorber and said output end distributing said intermediate liquor to the generator, said heat exchange conduit serially interconnecting said heat exchange elements to conduct said intermediate liquor between the generator and absorber heat transfer regions.

54. The apparatus of claim 53 wherein the heat exchange circuit further comprises a heat exchange circuit pump for circulating said intermediate liquor.

55. The apparatus of claim 53 wherein the intermediate liquor circulated between heat transfer regions of the generator and absorber is substantially in the liquid state.

56. The apparatus of claim 53 wherein said input end is a liquid accumulator and said output end is a distributor.

57. A heat pump comprising:

- an indoor liquid to air heat exchanger;
- an outdoor liquid to air heat exchanger;
- a generator-absorber heat exchange apparatus comprising:
  - a generator and an absorber, the absorber having an interior pressure lower than the interior pressure of the generator and each having high and low temperature regions at opposite ends and a heat transfer region, the temperature ranges defining the respective heat transfer regions overlapping;
  - a fluid flow pathway for circulation of a weak liquor from the high temperature region of the generator and a rich liquor from the low temperature region of the absorber to and through the high temperature and low temperature regions of the generator and the absorber;
  - a heat exchange circuit receiving a liquor from the fluid flow pathway from an input end in fluid communication with the fluid flow pathway at a location where the liquor has an intermediate concentration and circulating the intermediate liquor between the heat transfer regions of the generator and the absorber for heat transfer therein; and
- an antifreeze circuit circulating antifreeze fluid between each of the indoor and outdoor heat exchangers and the generator-absorber heat exchange apparatus for selectively extracting heat from one of said heat exchangers and transferring heat to the other of said heat exchangers.

58. The heat pump of claim 57, wherein the heat exchange circuit further comprises an output end for distributing the intermediate liquor within one of the generator and the absorber.

59. The heat pump of claim 58 wherein said heat exchange circuit comprises:

- two heat exchange elements disposed in the heat transfer region of the absorber and two heat exchange elements disposed in the heat transfer region of the generator;
- a heat exchange conduit with said input end receiving intermediate liquor from the generator and said output end distributing said intermediate liquor in the generator, said heat exchange conduit serially interconnecting said heat exchange elements to conduct said intermediate liquor alternately between the generator and absorber heat transfer regions.

60. The heat pump of claim 57 wherein said heat exchange circuit comprises:

- a heat exchange element disposed in the heat transfer region of the generator and a heat exchange element disposed in the heat transfer region of the absorber;
- a heat exchange conduit with said input end receiving intermediate liquor from the generator, said heat exchange conduit serially interconnecting said heat exchange elements to conduct said intermediate liquor between the generator and absorber heat transfer regions.

61. The heat pump of claim 58 wherein said heat exchange circuit comprises:

- a heat exchange element disposed in the heat transfer region of the absorber;
- a heat exchange conduit with said input end receiving intermediate liquor from the generator and said output end distributing said intermediate liquor to the generator, said heat exchange conduit conducting said intermediate liquor between the generator and absorber heat transfer regions.

62. The heat pump of claim 58 wherein said heat exchange circuit comprises:

- a heat exchange element disposed in the heat transfer region of the generator and a heat exchange element disposed in the heat transfer region of the absorber;
- a heat exchange conduit with said input end receiving intermediate liquor from the generator and said output end distributing said intermediate liquor to the generator, said heat exchange conduit serially interconnecting said heat exchange elements to conduct said intermediate liquor between the generator and absorber heat transfer regions.

63. The heat pump of claim 58 wherein said heat exchange circuit comprises:

- at least one heat exchange element disposed in the heat transfer region of the generator and at least one heat exchange element disposed in the heat transfer region of the absorber;
- a heat exchange conduit with said input end receiving intermediate liquor from the absorber and said output end distributing said intermediate liquor to the absorber, said heat exchange conduit serially interconnecting said heat exchange elements to conduct said intermediate liquor between the generator and absorber heat transfer regions.

64. The heat pump of claim 58 wherein said heat exchange circuit comprises:

- a heat exchange element disposed in the heat transfer region of the absorber;
- a heat exchange conduit with said input end receiving intermediate liquor from the absorber and said output end distributing said intermediate liquor to the absorber, said heat exchange conduit conducting said intermediate liquor between the generator and absorber heat transfer regions.

65. The heat pump of claim 64 wherein said heat exchange circuit further comprises a heat exchange element disposed in the heat transfer region of the generator.

66. The heat pump of claim 58 wherein said heat exchange circuit comprises:

at least two heat exchange elements disposed in the heat transfer region of the generator and at least three heat exchange elements disposed in the heat transfer region of the absorber;

a heat exchange conduit with said input end receiving intermediate liquor from the absorber and said output end distributing said intermediate liquor to the generator, said heat exchange conduit serially interconnecting said heat exchange elements to conduct said intermediate liquor between the generator and absorber heat transfer regions.

67. A method for transferring heat between an absorber and a generator in a generator-absorber heat exchange apparatus including a generator and an absorber, the absorber having an interior pressure lower than the pressure of the generator interior and each having high and low temperature regions at opposite ends establishing respective temperature ranges, the temperature ranges defining respective overlapping heat transfer regions, and a fluid flow pathway circulating a liquor having rich, intermediate and weak concentrations of refrigerant to and through the high temperature, heat transfer and low temperature regions of the generator and the absorber, said method comprising:

circulating a liquor having an intermediate concentration between the heat transfer region of the absorber and the heat transfer region of the generator.

68. The method for transferring heat between an absorber and a generator in accordance with claim 67, wherein said method comprises:

circulating intermediate liquor from an input end disposed to receive intermediate liquor from the generator, through the heat transfer region of the absorber and the heat transfer region of the generator, to an output end in the generator, such that the temperature of the intermediate liquor from the heat transfer region of said absorber is greater than the temperature of the region of the generator to which the intermediate liquor is circulated, thereby transferring heat to the generator from said intermediate liquor.

69. The method of claim 68, wherein said method comprises:

circulating the intermediate liquor alternately between said heat transfer regions serially via two heat exchange elements disposed in the heat transfer region of the absorber and two heat exchange elements disposed in the heat transfer region of the generator, thereby transferring heat via the intermediate liquor from the heat transfer region of the absorber to the heat transfer region of the generator.

70. The method of claim 69 wherein the intermediate liquor is circulated by a heat exchange circuit pump.

71. The method of claim 69 wherein the intermediate liquor circulated between heat transfer regions of the generator and absorber is substantially in the liquid state.

72. The method of claim 69 wherein said input and output ends are located in substantially the same region of the generator.

73. The method for transferring heat between an absorber and a generator in accordance with claim 67, wherein said method comprises:

circulating intermediate liquor from an input end disposed to receive intermediate liquor from the generator, through the heat transfer region of the absorber and the heat transfer region of the generator such that the temperature of the intermediate liquor from the heat transfer region of said absorber is greater than the temperature of the region of the generator to which the intermediate liquor is circulated, thereby transferring heat to the generator from said intermediate liquor.

74. The method of claim 73, wherein said method comprises:

circulating the intermediate liquor alternately between said heat transfer regions serially via a heat exchange element disposed in the heat transfer region of the absorber and a heat exchange element disposed in the heat transfer region of the generator, thereby transferring heat via the intermediate liquor from the heat transfer region of the absorber to the heat transfer region of the generator.

75. The method of claim 74 wherein the intermediate liquor is circulated by a heat exchange circuit pump.

76. The method of claim 74 wherein the intermediate liquor circulated between heat transfer regions of the generator and absorber is substantially in the liquid state.

77. The method for transferring heat between an absorber and a generator in accordance with claim 67, wherein said method comprises:

circulating intermediate liquor from an input end disposed to receive intermediate liquor from the generator, through the heat transfer region of the absorber to an output end in the generator, such that the temperature of the intermediate liquor from the heat transfer region of said absorber is greater than the temperature of the region of the generator to which the intermediate liquor is circulated, thereby transferring heat to the generator from said intermediate liquor.

78. The method of claim 77, wherein said method comprises:

circulating the intermediate liquor between said heat transfer regions via a heat exchange element disposed in the heat transfer region of the absorber, thereby transferring heat via the intermediate liquor from the heat transfer region of the absorber to the heat transfer region of the generator.

79. The method of claim 78 wherein the intermediate liquor circulated between heat transfer regions of the generator and absorber is a two phase mixture of liquid and vapor in at least a portion of the heat exchange circuit.

80. The method of claim 78 wherein said input and output ends are located in different regions of the generator.

81. The method of claim 68, wherein said method comprises:

circulating the intermediate liquor between said heat transfer regions via a heat exchange element disposed in the heat transfer region of the absorber and a heat exchange element disposed in the heat transfer region of the generator, thereby transferring heat via the intermediate liquor from the heat transfer region of the absorber to the heat transfer region of the generator.

82. The method of claim 81 wherein the intermediate liquor is circulated by a heat exchange circuit pump.

83. The method of claim 81 wherein the intermediate liquor circulated between heat transfer regions of the generator and absorber is a two phase mixture of liquid and vapor in at least a portion of the heat exchange circuit.

84. The method of claim 81 wherein said input and output ends are located in substantially the same region of the generator.

85. The method for transferring heat between an absorber and a generator in accordance with claim 67, wherein said method comprises:

circulating intermediate liquor from an input end disposed to receive intermediate liquor from the absorber, through the heat transfer region of the absorber and through the heat transfer region of the generator to an output end in the absorber, such that the temperature of the intermediate liquor from the heat transfer region of said absorber is greater than the temperature of the region of the generator to which the intermediate liquor is circulated, thereby transferring heat to the generator from said intermediate liquor.

86. The method of claim 85, wherein said method comprises:

circulating the intermediate liquor between said heat transfer regions via at least one heat exchange element disposed in the heat transfer region of the absorber and at least one heat exchange element disposed in the heat transfer region of the generator, thereby transferring heat via the intermediate liquor from the heat transfer region of the absorber to the heat transfer region of the generator.

87. The method of claim 86 wherein the intermediate liquor is circulated by a heat exchange circuit pump.

88. The method of claim 86 wherein the intermediate liquor circulated between heat transfer regions of the generator and absorber is a two phase mixture of liquid and vapor in at least a portion of the heat exchange circuit.

89. The method of claim 86 wherein the intermediate liquor circulated between heat transfer regions of the generator and absorber is substantially in the liquid state.

90. The method of claim 87 wherein said input and output ends are located in substantially the same region of the absorber.

91. The method for transferring heat between an absorber and a generator in accordance with claim 68, wherein said method comprises:

circulating intermediate liquor from an input end disposed to receive intermediate liquor from the absorber, through the heat transfer region of the absorber and through the heat transfer region of the generator to an output end in the generator, such that the temperature of the intermediate liquor from the heat transfer region of said absorber is greater than the temperature of the region of the generator to which the intermediate liquor is circulated, thereby transferring heat to the generator from said intermediate liquor.

92. The method of claim 91, wherein said method comprises:

circulating the intermediate liquor between said heat transfer regions via a heat exchange element disposed in the heat transfer region of the absorber, thereby transferring heat via the intermediate liquor from the heat transfer region of the absorber to the heat transfer region of the generator.

93. The method of claim 91, wherein said method comprises:

circulating the intermediate liquor between said heat transfer regions via a heat exchange element disposed in the heat transfer region of the absorber and a heat exchange element disposed in the heat transfer region of the generator, thereby transferring heat via the intermediate liquor from the heat transfer region of the absorber to the heat transfer region of the generator.

94. The method of claim 93 wherein the intermediate liquor is circulated by a heat exchange circuit pump.

95. The method of claim 93 wherein the intermediate liquor circulated between heat transfer regions of the generator and absorber is a two phase mixture of liquid and vapor in at least a portion of the heat exchange circuit.

96. The method of claim 91, wherein said method comprises:

circulating the intermediate liquor between said heat transfer regions via at least three heat exchange elements disposed in the heat transfer region of the absorber and at least two heat exchange elements disposed in the heat transfer region of the generator, thereby transferring heat via the intermediate liquor from the heat transfer region of the absorber to the heat transfer region of the generator.

97. The method of claim 96 wherein the intermediate liquor is circulated by a heat exchange circuit pump.

98. The method of claim 96 wherein the intermediate liquor circulated between heat transfer regions of the generator and absorber is substantially in the liquid state.

99. A method of transferring heat between a region of medium temperature and a region of high temperature using a generator-absorber heat exchange apparatus including a generator and an absorber, the absorber having an interior pressure lower than the pressure of the generator interior and each having high and low temperature regions at opposite ends establishing respective temperature ranges, the temperature ranges defining respective overlapping heat transfer regions, and a fluid flow pathway circulating a liquor having rich, intermediate and weak concentrations of refrigerant to and through the high temperature, heat transfer and low temperature regions of the generator and the absorber, said method comprising:

circulating an antifreeze fluid between an outdoor heat exchanger and at least one of an absorber heat exchanger, a condenser heat exchanger and a generator heat exchanger, thereby transferring heat via said antifreeze fluid from said at least one absorber, condenser and generator heat exchanger to said outdoor heat exchanger;

circulating an antifreeze fluid between an indoor heat exchanger and an evaporator heat exchanger, thereby transferring heat via said antifreeze fluid from said indoor heat exchanger to said evaporator heat exchanger; and wherein said generator-absorber heat exchange apparatus includes a heat exchange circuit disposed to receive a liquor from the fluid flow pathway at a location where the liquor has an intermediate liquor concentration and to circulate said intermediate liquor between said heat transfer regions to transfer heat from the absorber to the generator.

100. A method of transferring heat between a region of low temperature and a region of medium temperature using a generator-absorber heat exchange apparatus including a generator and an absorber, the absorber having an interior pressure lower than the pressure of the generator interior and each having high and low temperature regions at opposite ends establishing respective temperature ranges, the temperature ranges defining respective overlapping heat transfer regions, and a fluid flow pathway circulating a liquor having rich, intermediate and weak concentrations of refrigerant to and through the high temperature, heat transfer and low temperature regions of the generator and the absorber, said method comprising:

circulating an antifreeze fluid between an indoor heat exchanger and at least one of an absorber heat exchanger, a condenser heat exchanger and a generator heat exchanger, thereby transferring heat via said antifreeze fluid from said at least one absorber, condenser and generator heat exchanger to said indoor heat exchanger;

circulating an antifreeze fluid between an outdoor heat exchanger and an evaporator heat exchanger, thereby transferring heat via said antifreeze fluid from said outdoor heat exchanger to said evaporator heat exchanger; and wherein said generator-absorber heat exchange apparatus includes a heat exchange circuit disposed to receive a liquor from the fluid flow pathway at a location where the liquor has an intermediate liquor concentration and to circulate said intermediate liquor between said heat transfer regions to transfer heat from the absorber to the generator.

* * * * *

UNITED STATES PATENT AND TRADEMARK OFFICE
CERTIFICATE OF CORRECTION

PATENT NO. : 5,570,584

DATED : November 5, 1996

INVENTOR(S) : PHILLIPS et al.

It is certified that error appears in the above-identified patent and that said Letters Patent is hereby corrected as shown below:

Claim 5, column 23, line 48, delete "the".

Signed and Sealed this

Eighteenth Day of February, 1997

Attest:

BRUCE LEHMAN

*Attesting Officer*      *Commissioner of Patents and Trademarks*